US011163143B2

United States Patent
Hirata

(10) Patent No.: US 11,163,143 B2
(45) Date of Patent: Nov. 2, 2021

(54) OBSERVATION APPARATUS

(71) Applicant: OLYMPUS CORPORATION, Tokyo (JP)

(72) Inventor: Tadashi Hirata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 405 days.

(21) Appl. No.: 16/285,424

(22) Filed: Feb. 26, 2019

(65) Prior Publication Data

US 2019/0187450 A1 Jun. 20, 2019

Related U.S. Application Data

(63) Continuation of application No. PCT/JP2017/029336, filed on Aug. 15, 2017.

(30) Foreign Application Priority Data

Sep. 6, 2016 (WO) .................. PCT/JP2016/076090

(51) Int. Cl.
*G02B 21/06* (2006.01)
*G02B 21/02* (2006.01)
(Continued)

(52) U.S. Cl.
CPC ............. *G02B 21/06* (2013.01); *G02B 21/00* (2013.01); *G02B 21/02* (2013.01); *G02B 21/26* (2013.01); *G02B 21/36* (2013.01)

(58) Field of Classification Search
CPC ........ G02B 21/06; G02B 21/00; G02B 21/26; G02B 21/36; G02B 21/02
See application file for complete search history.

(56) References Cited

U.S. PATENT DOCUMENTS

| 5,751,475 A | 5/1998 | Ishiwata et al. |
|---|---|---|
| 9,060,684 B2 | 6/2015 | Houjou et al. |

(Continued)

FOREIGN PATENT DOCUMENTS

| EP | 2993509 A1 | 3/2016 |
|---|---|---|
| EP | 3211469 A1 | 8/2017 |

(Continued)

OTHER PUBLICATIONS

International Search Report dated Dec. 13, 2016 issued in PCT/JP2016/076090.

(Continued)

*Primary Examiner* — Wen Huang
(74) *Attorney, Agent, or Firm* — Scully, Scott, Murphy & Presser, P.C.

(57) ABSTRACT

An observation apparatus is provided with: an illumination optical system that emits illumination light upward from below a specimen; and an image-capture optical system that captures, below the specimen, transmitted light which is the illumination light that has been reflected above the specimen and passed through the specimen, wherein the illumination optical system is provided with a diffusion plate, the image-capture optical system is provided with an objective optical system, and, in the case in which an emission region in the illumination optical system is projected to a pupil of the image-capture optical system, predetermined conditions are satisfied so as to partially block the illumination light at an edge portion of the pupil of the objective optical system.

3 Claims, 23 Drawing Sheets

(51) Int. Cl.
G02B 21/00 (2006.01)
G02B 21/26 (2006.01)
G02B 21/36 (2006.01)

(56) References Cited

U.S. PATENT DOCUMENTS

| | | |
|---|---|---|
| 9,578,220 B2 | 2/2017 | Houjou et al. |
| 2013/0156287 A1 | 6/2013 | Houjou et al. |
| 2015/0264235 A1 | 9/2015 | Houjou et al. |
| 2016/0048011 A1 | 2/2016 | Suzuki et al. |
| 2017/0261732 A1 | 9/2017 | Takahashi et al. |
| 2017/0355949 A1 | 12/2017 | Hirata et al. |
| 2018/0267285 A1 | 9/2018 | Hirata et al. |

FOREIGN PATENT DOCUMENTS

| | | |
|---|---|---|
| EP | 3279713 A1 | 2/2018 |
| JP | H07261089 A | 10/1995 |
| JP | 2006174764 A | 7/2006 |
| JP | 2016071117 A | 5/2016 |
| WO | 2012029817 A1 | 3/2012 |
| WO | 2014178294 A1 | 11/2014 |
| WO | 2016158780 A1 | 10/2016 |
| WO | 2016158782 A1 | 10/2016 |
| WO | 2017104068 A1 | 6/2017 |

OTHER PUBLICATIONS

International Search Report dated Oct. 10, 2017 issued in PCT/JP2017/029336.

FIG. 18

| ILLUMINATION SYSTEM | OBJECTIVE OPTICAL SYSTEM PARAMETERS | | | | CONTAINER PARAMETERS | | | |
|---|---|---|---|---|---|---|---|---|
| H″ | FOV | WD | NA | D | T | Htmax | Hbmax | Htmin | Hbmin |
| 15 | 3 | 5 | 0.25 | 8.5 | 3 | 40 | 2 | 15 | 2 |

| ILLUMINATION SYSTEM | CONDITION 4 | FRAME DIAMETER | CONDITIONS 7 AND 8 | CONDITIONS 5 AND 6 | RELATED PARAMETERS | | | |
|---|---|---|---|---|---|---|---|---|
| H″ | Namin> | Dmin> | Y1< | Y2> | Hmax | Hmin | H′max | H′min |
| 15 | 0.17 | 7.73 | 9.25 | 24.75 | 38 | 13 | 17 | 17 |

FIG. 20

| ILLUMINATION SYSTEM | | OBJECTIVE OPTICAL SYSTEM PARAMETERS | | | | | CONTAINER PARAMETERS | | | | |
|---|---|---|---|---|---|---|---|---|---|---|---|
| H″ | | FOV | WD | NA | D | T | Htmax | Hbmax | Htmin | Hbmin | |
| 18 | | 3 | 5 | 0.3 | 9 | 3 | 32 | 2 | 10 | 1 | |
| 3 | | | | | | | 40 | 2 | 18 | 2 | |

| ILLUMINATION SYSTEM | CONDITION 4 | FRAME DIAMETER | CONDITIONS 7 AND 8 | | CONDITIONS 5 AND 6 | | RELATED PARAMETERS | | | |
|---|---|---|---|---|---|---|---|---|---|---|
| H″ | NAmin | Dmin | Y1 | | Y2 | | Hmax | Hmin | H′max | H′min |
| 18 | 0.25 | 8.50 | 9.60 | | 25.50 | | 30 | 9 | 20 | 19 |
| 3 | | | 9.60 | | 25.80 | | | | | |

FIG. 22

| ILLUMINATION SYSTEM | OBJECTIVE OPTICAL SYSTEM PARAMETERS | | | | | CONTAINER PARAMETERS | | | |
|---|---|---|---|---|---|---|---|---|---|
| H″ | FOV | WD | NA | D | T | Htmax | Hbmax | Htmin | Hbmin |
| 18 | 3 | 5 | 0.3 | 9 | 3 | 25 | 2 | 10 | 1 |
| 18 | | | | | | 40 | 2 | 25 | 2 |

| ILLUMINATION SYSTEM | CONDITION 4 | FRAME DIAMETER | CONDITIONS 7 AND 8 | | CONDITIONS 5 AND 6 | | RELATED PARAMETERS | | | |
|---|---|---|---|---|---|---|---|---|---|---|
| H″ | NAmin | Dmin | Y1 | | Y2 | | Hmax | Hmin | H′max | H′min |
| 18 | 0.25 | 8.50 | 9.60 | | 21.30 | | 23 | 9 | 20 | 19 |
| 18 | | | 18.30 | | 30.30 | | | | | |

FIG. 24

| ILLUMINATION SYSTEM | OBJECTIVE OPTICAL SYSTEM PARAMETERS | | | | CONTAINER PARAMETERS | | | | |
|---|---|---|---|---|---|---|---|---|---|
| H″ | FOV | WD | NA | | | Htmax | Hbmax | Htmin | Hbmin |
| 6 | 4 | 5 | 0.16 | | | 40 | 2 | 18 | 1 |

| ILLUMINATION SYSTEM | CONDITION 4 | FRAME DIAMETER | CONDITIONS 7 AND 8 | CONDITIONS 5 AND 6 | | RELATED PARAMETERS | | | |
|---|---|---|---|---|---|---|---|---|---|
| H″ | ⟨Namin⟩ | ⟨Dmin⟩ | Y1 | Y2 | | Hmax | Hmin | H′max | H′min |
| 6 | 0.16 | 8.62 | 4.56 | 15.44 | | 38 | 17 | 8 | 7 |

OBSERVATION APPARATUS

CROSS-REFERENCE TO RELATED APPLICATIONS

This is a continuation of International Application PCT/JP2017/029336, with an international filing date of Aug. 15, 2017, which is hereby incorporated by reference herein in its entirety. This application claims the benefit of International Application PCT/JP2016/076090, with an international filing date of Sep. 6, 2016, the content of which is incorporated herein by reference.

TECHNICAL FIELD

The present invention relates to an observation apparatus.

BACKGROUND ART

In the related art, as an apparatus for observing an imaging subject such as cells or the like without labeling the imaging subject, there is a known observation apparatus that employs a phase contrast observation method or a differential interference observation method (for example, see Patent Literature 1).

CITATION LIST

Patent Literature

{PTL 1} Japanese Unexamined Patent Application, Publication No. Hei 7-261089

SUMMARY OF INVENTION

The present invention provides the following solutions.

An aspect of the present invention is an observation apparatus including an illumination optical system that emits illumination light upward from below a specimen accommodated in a container; and an image-capture optical system that captures, below the specimen, transmitted light which is the illumination light emitted from the illumination optical system that has been reflected above the specimen and passed through the specimen, wherein the illumination optical system is provided with a diffusion member that spreads out the illumination light from an emission region having a specific area, the image-capture optical system is provided with an objective optical system that collects the transmitted light, and in the case in which the emission region in the illumination optical system is projected to a pupil of the objective optical system, the following conditions are satisfied so as to partially block the illumination light at an edge portion of the pupil of the objective optical system;

$$NA\ min > (D+FOVy)/(4Ht\ min - 4Hb\ min + 2WD)$$

$$NA\ min > (FOVy+T/2)/(2Ht\ min - 2Hb\ min)$$

$$Y2 > NA(2Ht\ max + H'' - Hb\ max) + (FOVy/2)$$

$$Y1 > NA(2Ht\ min + H'' - Hb\ min) + (FOVy/2)$$

where NA min is a lowest value of a numerical aperture on a specimen side of the objective optical system required on the basis of an oblique-illumination condition; D is a diameter of a portion of a frame of the objective optical system close to the specimen; FOVy is an actual field of view of the objective optical system; Ht min is a lowest value of a height of a reflection surface for the illumination light above the specimen with respect to a container mounting surface; Hb min is a lowest value of a height of a surface at which the illumination light is incident on the specimen with respect to the container mounting surface; WD is a working distance of the objective optical system; T is a difference between the diameter of the portion of the frame of the objective optical system close to the specimen and a diameter of an effective luminous-flux of the objective optical system at that portion; Y2 is a distance to an end in the emission region of the diffusion member, which is far from the objective optical system with respect to an optical axis of the objective optical system; Ht max is a highest value of the height of the reflection surface for the illumination light above the specimen with respect to the container mounting surface; H" is a height of the container mounting surface with respect to the emission region of the diffusion member; Hb max is a highest value of the height of the surface at which the illumination light is incident on the specimen with respect to the container mounting surface; and Y1 is the distance to an end in the emission region of the diffusion member close to the objective optical system with respect to the optical axis of the objective optical system.

BRIEF DESCRIPTION OF DRAWINGS

FIG. 18 is a diagram showing, for the observation apparatus in FIG. 16, examples of various parameters that satisfy conditional expressions (5), (6), (7), and (8).

FIG. 20 is a diagram showing, for the observation apparatus in FIG. 19, examples of various parameters that satisfy conditional expressions (5), (6), (7), and (8).

FIG. 22 is a diagram showing, for the observation apparatus in FIG. 21, examples of various parameters that satisfy conditional expressions (5), (6), (7), and (8).

FIG. 24 is a diagram showing, for the observation apparatus in FIG. 23, examples of various parameters that satisfy conditional expressions (5), (6), (7), and (8).

DESCRIPTION OF EMBODIMENT

An observation apparatus 1 according to an embodiment of the present invention will be described below with respect to the drawings.

Figure 1:
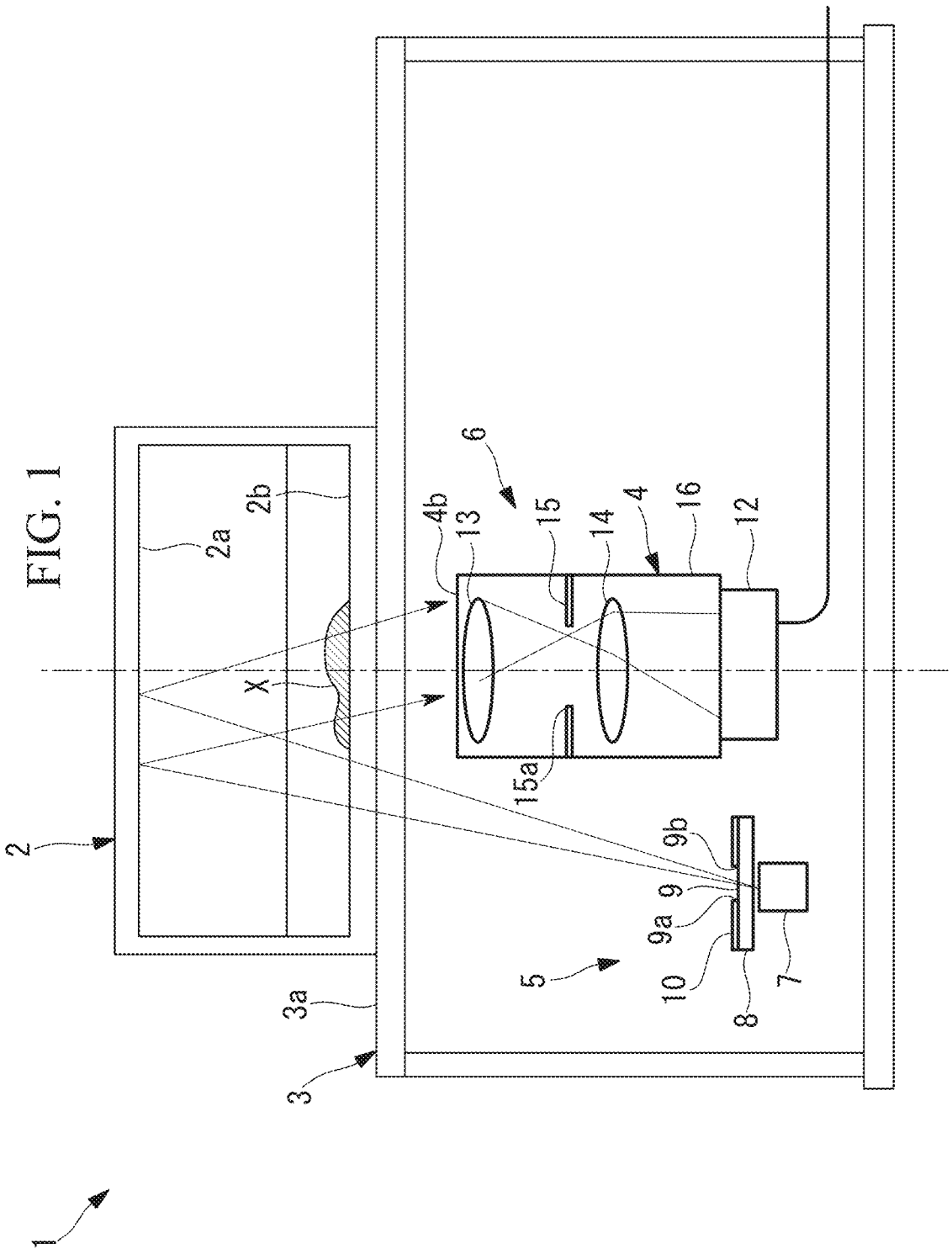
FIG. 1 is a longitudinal cross-sectional view of an observation apparatus according to an embodiment of the present invention.

As shown in FIG. 1, the observation apparatus 1 according to this embodiment is provided with: a stage 3 on which a container 2 that accommodates a specimen X is placed; an objective optical system (objective lens) 4 that is disposed below the stage 3 and that collects light passing through the stage 3 from above; an image-capture optical system 6 that captures the light that has passed through the specimen X and that has been collected by the objective optical system 4; and an illumination optical system 5 that is disposed radially outside the objective optical system 4 and that emits illumination light upward passing through the stage 3.

An optically transparent material, for example, a glass plate $3a$, is disposed on the stage 3 so as to cover the objective optical system 4 and the illumination optical system 5 from above and the container 2 is placed on a top surface container mounting surface of the glass plate $3a$.

The container 2 is, for example, a cell-culturing flask having a top plate (reflection surface) $2a$ that reflects light and a bottom surface (specimen mounting surface) $2b$ on which the specimen X is placed, and is entirely formed of an optically transparent resin.

The illumination optical system 5 is provided with: an LED light source 7 that generates the illumination light; and a diffusion plate (diffusion member) 8 that spreads out the illumination light emitted from the LED light source 7.

The diffusion plate 8 is provided with an illumination mask 10 that limits an emission region 9 through which the illumination light coming from the LED light source 7 is emitted.

The image-capture optical system 6 is provided with, in addition to the objective optical system 4, an image-acquisition device 12 that captures the transmitted light collected by the objective optical system 4, a processor (not shown) that generates an image from information of the transmitted light captured by the image-acquisition device 12, and so forth.

The objective optical system 4 is provided with: a distal-end lens 13 that is disposed at a distal end; a base-end lens 14 that is disposed on a base-end side with respect to the distal-end lens 13 with a spacing therebetween in a direction along the optical axis; a pupil (aperture) 15 that is disposed in the optical axis between the distal-end lens 13 and the base-end lens 14; and a frame 16 that accommodates theses components.

For the observation apparatus 1 thus configured, conditions for preventing vignetting of a luminous flux of the illumination light coming into the container 2 from the LED light source 7 from occurring at the frame 16 of the objective optical system 4 will be described.

Figure 2:
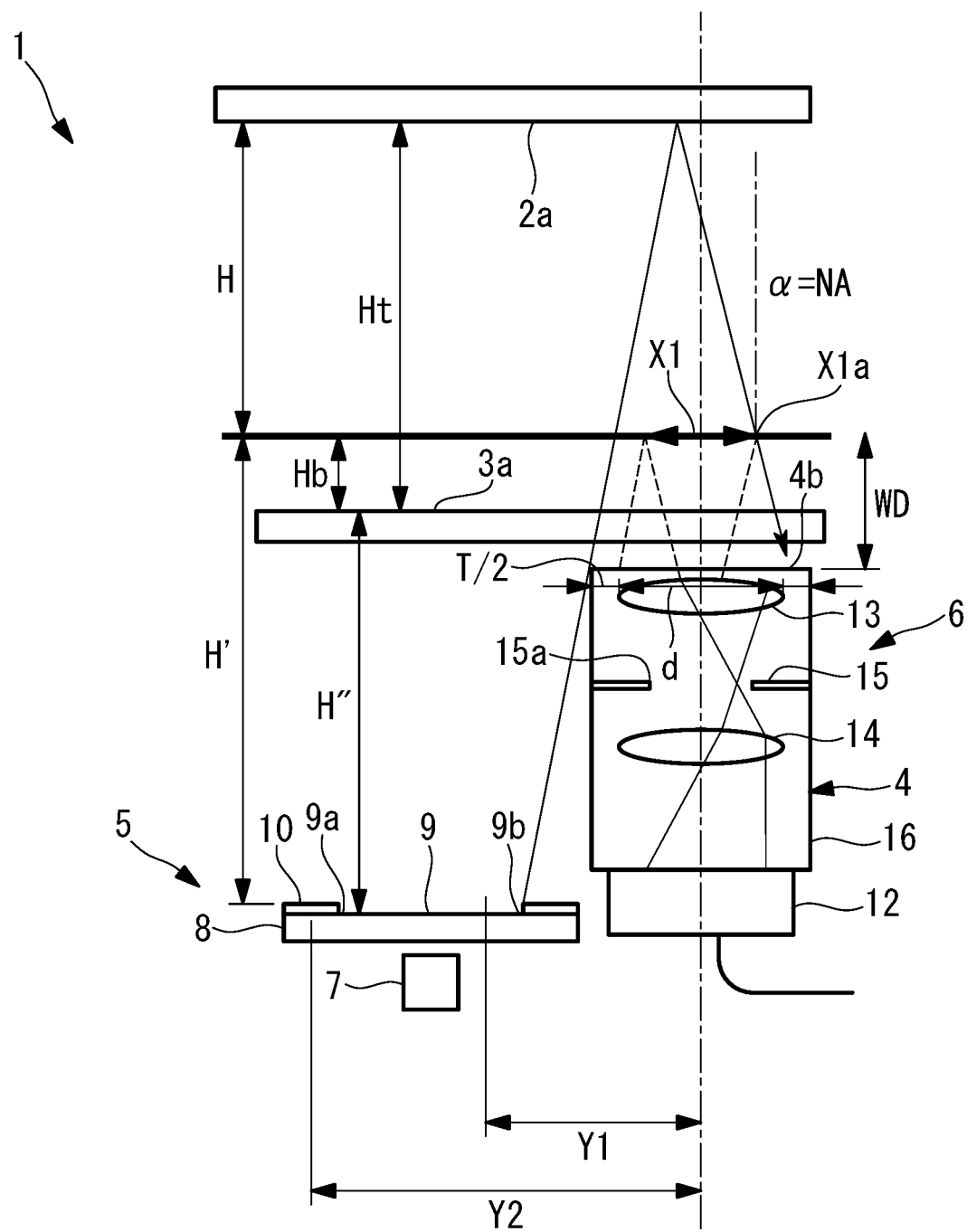
FIG. 2 is a longitudinal cross-sectional view showing an example of a trajectory of a light ray of illumination light that is emitted from the illumination optical system in FIG. 1, that is reflected by a top plate of a container, and that is made incident on an objective optical system.

First, as shown in FIG. 2, with regard to light that passes through a right end (an end on a far side from the illumination optical system 5) $X1a$ of a field of view at an angle of NA, the position of a trajectory of a light ray in the horizontal direction at a distal end $4b$ of the objective optical system 4 is determined by the following expression:

$$-FOVy/2+NA(2H+WD).$$

Also, in order to prevent vignetting of the light ray of the illumination light from occurring at the frame 16 of the objective optical system 4, it is necessary for the illumination light to pass through a position that is to the left of the frame 16 of the objective optical system 4, and it is necessary for the following conditional expression to be satisfied.

$$-FOVy/2+NA(2H+WD)>D/2$$

Here, FOVy is the actual field of view of the objective optical system 4 (actual field of view corresponds to a maximum value with respect to the illuminating direction, and need not be diagonal); NA is the numerical aperture of the objective optical system 4 on the specimen-X side; H is the height of the top plate 2a of the container 2 with respect to a surface (focus surface: hereinafter referred to as the "specimen surface") X1 on which the illumination light is incident on the specimen X; and WD is the height of the specimen surface X1 with respect to the working distance (the higher one of a portion of the frame 16 of the objective optical system 4 closest to the specimen X and the distal-end lens 13 of the objective optical system 4).

In the case in which the height of the top plate 2a of the container 2 is set, a minimum value NA min of NA required for the objective optical system 4 satisfies conditional expressions (1') and (2').

$$NA\ min > (D+FOVy)/(4H+2WD) \quad (1')$$

$$NA\ min > (D+FOVy)/(4Ht-4Hb+2WD) \quad (2')$$

Here, NA min is the lowest value of NA required on the basis of an oblique-illumination condition; D is the diameter of a portion of the frame 16 of the objective optical system 4 close to the specimen X; Ht is the height of the top plate 2a of the container 2 with respect to the top surface (container mounting surface) of the glass plate 3a of the stage 3; and Hb is the height of the specimen surface X1 with respect to the top surface (container mounting surface) of the glass plate 3a of the stage 3.

An objective optical system 4 having a greater NA is required with a decrease in the height of the top plate 2a of the container 2. Because of this, it is desirable that the NA of the objective optical system 4 be compatible with the lowest height of the top plate 2a of the container 2, thus satisfying conditional expressions (1) and (2).

$$NA\ min > (D+FOVy)/(4H\ min+2WD) \quad (1)$$

$$NA\ min > (D+FOVy)/(4Ht\ min-4Hb\ min+2WD) \quad (2)$$

Here, H min is the lowest value of the height of the top plate 2a of the container 2 with respect to the specimen surface X1; Ht min is the lowest value of the height of the top plate 2a of the container with respect to the top surface (container mounting surface) of the glass plate 3a of the stage 3; and Hb min is the lowest value of the height of the specimen surface X1 with respect to the top surface (container mounting surface) of the glass plate 3a of the stage 3.

At the portion of the frame 16 of the objective optical system 4 close to the specimen X, an effective luminous-flux diameter d of the objective optical system 4 is determined by the following expression.

$$d=FOVy+2WD \cdot NA\ min$$

In addition, a minimum value D min of the diameter of the portion of the frame 16 of the objective optical system 4 close to the specimen X required on the basis of the oblique-illumination condition is determined by the following expression (3), because an allowance (a difference in the diameter of the portion of the frame 16 of the objective optical system 4 close to the specimen X and the diameter of the luminous flux at that portion) T for d is additionally needed so that the frame 16 does not cause vignetting of the light ray of the illumination light.

$$D\ min=FOVy+2NA\ min \cdot WD+T \quad (3)$$

Applying expression (3) to conditional expression (2) gives conditional expression (4).

$$NA\ min > (FOVy+T/2)/(2Ht\ min-2Hb\ min) \quad (4)$$

Figure 3:
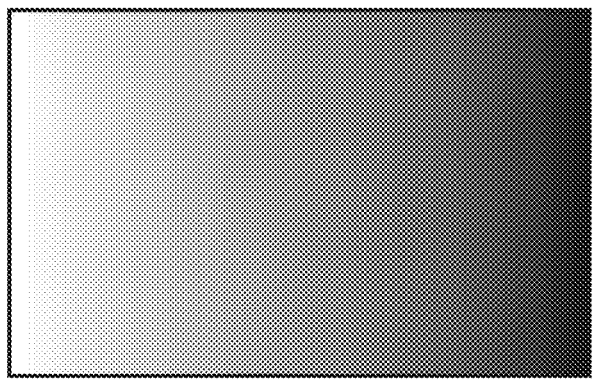
FIG. 3 is a diagram showing an example of an image in which the periphery of a field of view is darkened.

As shown in FIG. 3, when NA falls below values indicated by conditional expressions (1), (2), (3), and (4), the periphery of the field of view of the objective optical system 4, the right side of the field of view in particular, becomes dark, thus making it impossible to observe the specimen X.

Next, the conditions for the illumination light to strike a pupil end at the pupil surface of the objective optical system 4 will be described.

Figure 4:
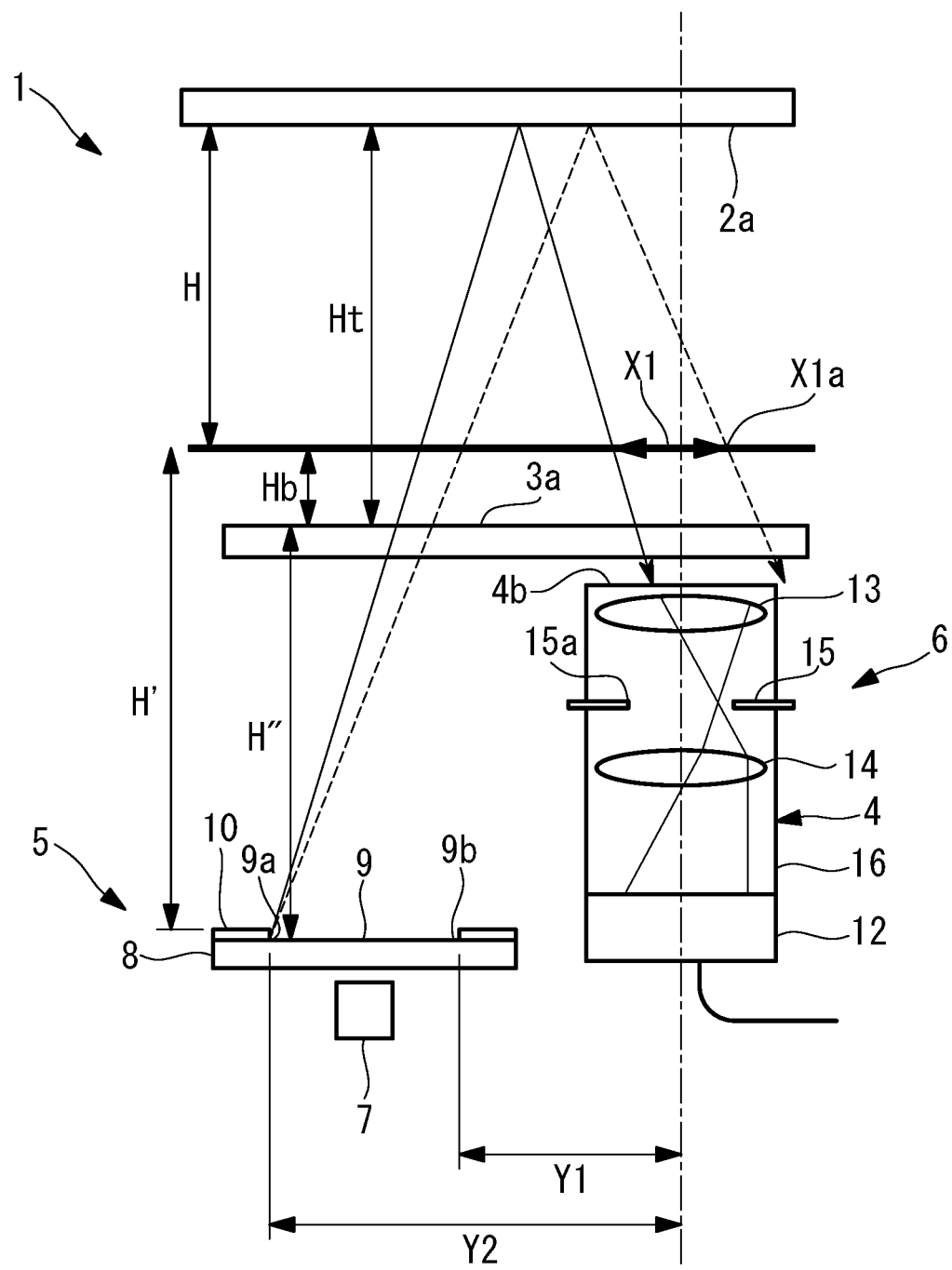
FIG. 4 is a longitudinal cross-sectional view showing, in a diffusion plate in FIG. 1, an example of a trajectory of the light ray of the illumination light emitted from an emission-region end far from the objective optical system.

As shown in FIG. 4, the illumination light emitted from an emission-region end 9a in the diffusion plate 8, which is far from the objective optical system 4, enters the objective optical system 4 at a maximum angle. Also, the condition for achieving oblique illumination in the entire observation field of view is that an image of the illumination light that is emitted from the emission-region end 9a in the diffusion plate 8 and that has passed through a left end (an end on the side close to the illumination optical system 5) is formed outside a pupil 15 of the objective optical system 4.

In this case, a distance Y2 to the emission-region end 9a in the diffusion plate 8, which is far from the objective optical system 4 with respect to the optical axis of the objective optical system 4, needs to satisfy conditional expression (5').

$$Y2>NA(2H+H')+(FOVy/2) \quad (5')$$

Here, H' is the height of the specimen surface X1 with respect to the emission region 9 in the diffusion plate 8.

Figure 5A:
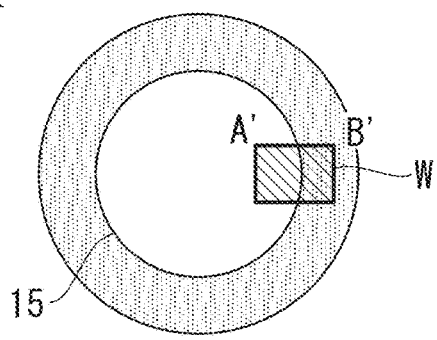
FIG. 5A is a diagram showing an example of the position of luminous flux in a pupil surface for light that has passed a left end of a field of view.
Figure 5B:
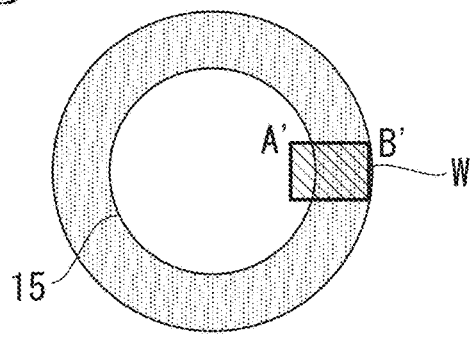
FIG. 5B is a diagram showing an example of the position of luminous flux in the pupil surface for light that has passed a right end of the field of view.

FIG. 5A shows the position of a luminous flux W at the pupil surface of the objective optical system 4 for the illumination light that has passed through the left end of the field of view, and FIG. 5B shows the position of the luminous flux W at the pupil surface of the objective optical system 4 for the illumination light that has passed through the right end X1a of the field of view.

When Y2 falls below the value indicated by conditional expression (5'), because the angle at which the illumination light enters the objective optical system 4 becomes small, which causes the entire luminous flux W to pass through the inside of the pupil 15, the oblique-illumination condition is not met, and thus, contrast decreases.

Figure 6A:
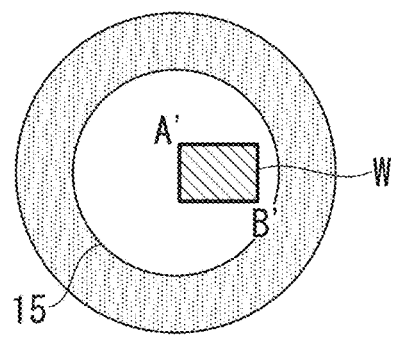
FIG. 6A is a diagram showing an example of the position of luminous flux in the pupil surface for the light that has passed the left end of the field of view.
Figure 6B:
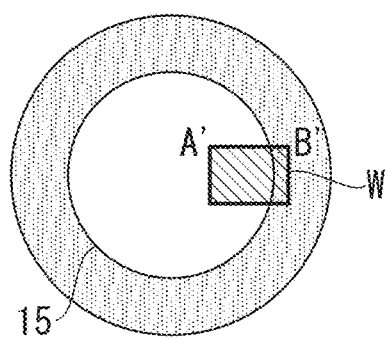
FIG. 6B is a diagram showing the position of luminous flux in the pupil surface for the light that has passed the right end of the field of view.

FIG. 6A shows the position of the luminous flux W at the pupil surface of the objective optical system 4 for the illumination light that has passed through the left end of the field of view, and FIG. 6B shows the position of the luminous flux W at the pupil surface of the objective optical system 4 for the illumination light that has passed through the right end X1a of the field of view. Note that a light ray indicated by the solid line in FIG. 4 corresponds to an end surface on a far side from the optical axis of the luminous flux W at the pupil surface shown in FIG. 6A.

Figure 7:
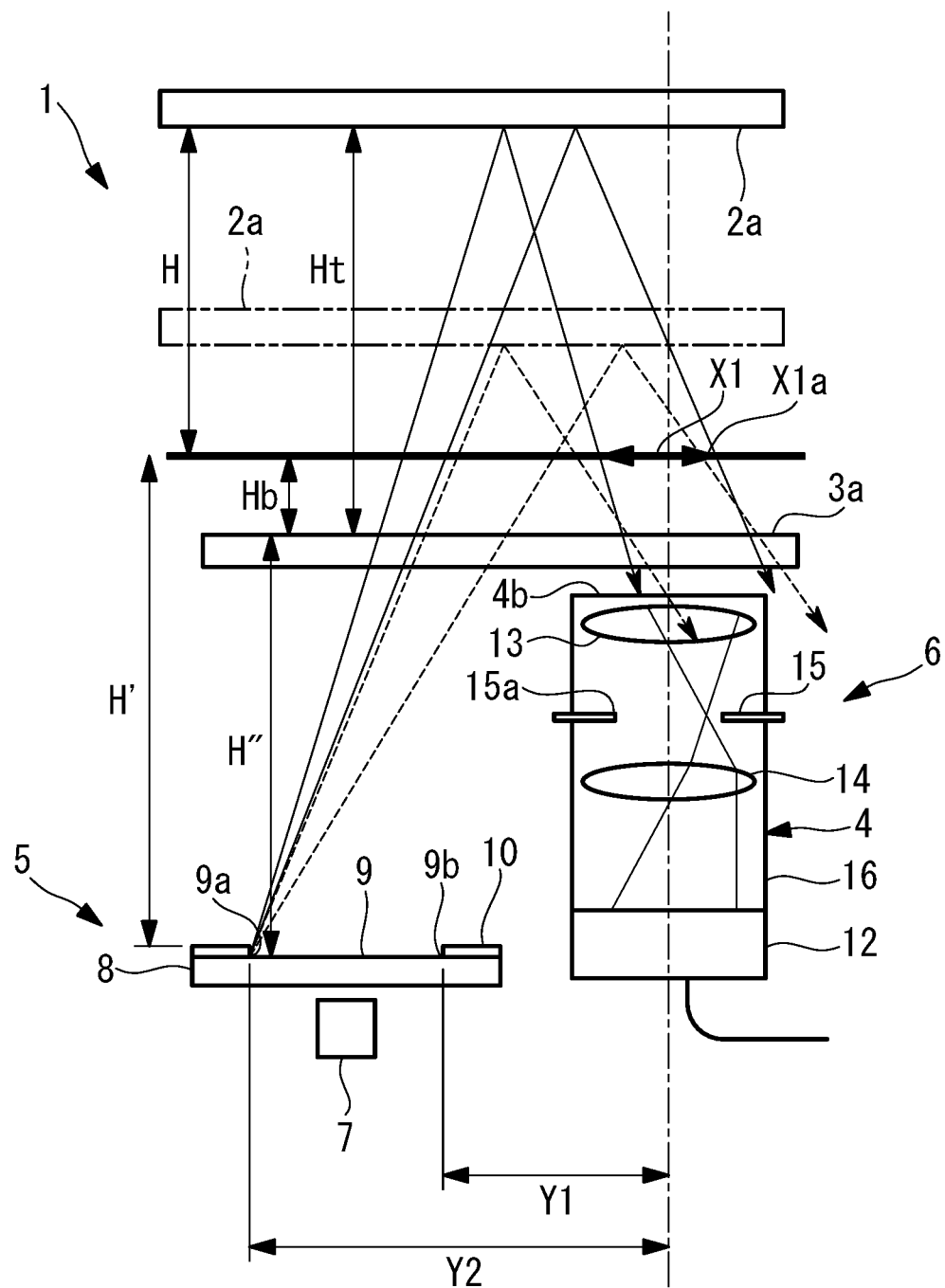
FIG. 7 is a longitudinal cross-sectional view showing, in the diffusion plate in FIG. 1, another example of the trajectory of the light ray of the illumination light emitted from the emission-region end far from the objective optical system.

As shown in FIG. 7, as a result of changes in the height of the top plate 2a of the container 2, the angle of the illumination light that enters the objective optical system 4 changes. The entry angle of the illumination light decreases with an increase in the height of the top plate 2a, which makes it easier for the image of the illumination light at the pupil surface to fall closer to the inner side than to the pupil end. Therefore, it is desirable that conditional expression (1') be satisfied with respect to the container 2 in which the height of the top plate 2a is the highest (height H max).

In this case, the distance Y2 to the emission-region end 9a in the diffusion plate 8, which is far from the objective optical system 4 with respect to the optical axis of the objective optical system 4, needs to satisfy conditional expressions (5) and (6).

$$Y2>NA(2H\ max+H'max)+(FOVy/2) \quad (5)$$

$$Y2>NA(2Ht\ max+H''-Hb\ max)+(FOVy/2) \quad (6)$$

Here, H max is the highest value of the height of the top plate 2a of the container 2 with respect to the specimen surface Xl; H'max is the highest value of the height of the specimen surface X1 with respect to the emission region 9 in the diffusion plate 8; Ht max is the highest value of the height of the top plate 2a of the container 2 with respect to the top surface (container mounting surface) of the glass plate 3a of the stage 3; H" is the height of the top surface (container mounting surface) of the glass plate 3a of the stage 3 with respect to the emission region 9 in the diffusion plate 8; and Hb max is the height of the specimen surface X1 with respect to the top surface (container mounting surface) of the glass plate 3a of the stage 3.

Figure 8A:
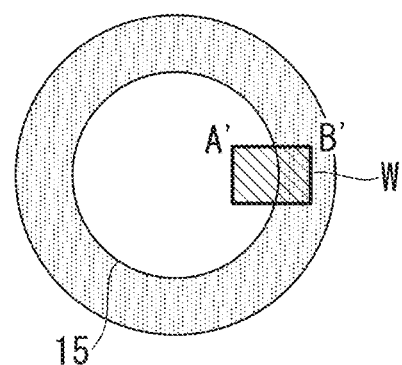
FIG. 8A is a diagram showing an example of the position of luminous flux of the illumination light in the pupil surface in the case in which the top plate of the container is low.
Figure 8B:
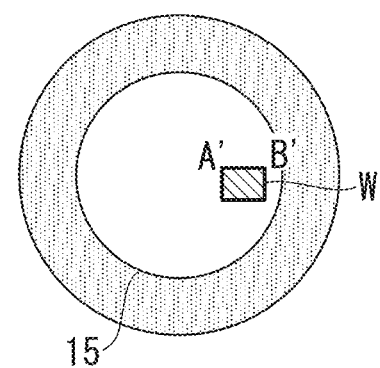
FIG. 8B is a diagram showing an example of the position of luminous flux of the illumination light in the pupil surface in the case in which the top plate of the container is high.

FIG. 8A shows the position of the luminous flux W of the illumination light at the pupil surface in the case in which the top plate 2a of the container 2 is low, and FIG. 8B shows the position of the luminous flux W of the illumination light at the pupil surface in the case in which the height of the top plate 2a of the container 2 is high.

When Y2 falls below the values indicated by conditional expressions (5) and (6), because the angle at which the illumination light enters the objective optical system 4 decreases, which causes the entire luminous flux W to pass through the inside of the pupil 15, the oblique-illumination condition is not met, and thus, contrast decreases.

Next, the conditions for a luminous flux of the illumination light not to fall outside the pupil 15 of the objective optical system 4 will be described.

Figure 9:
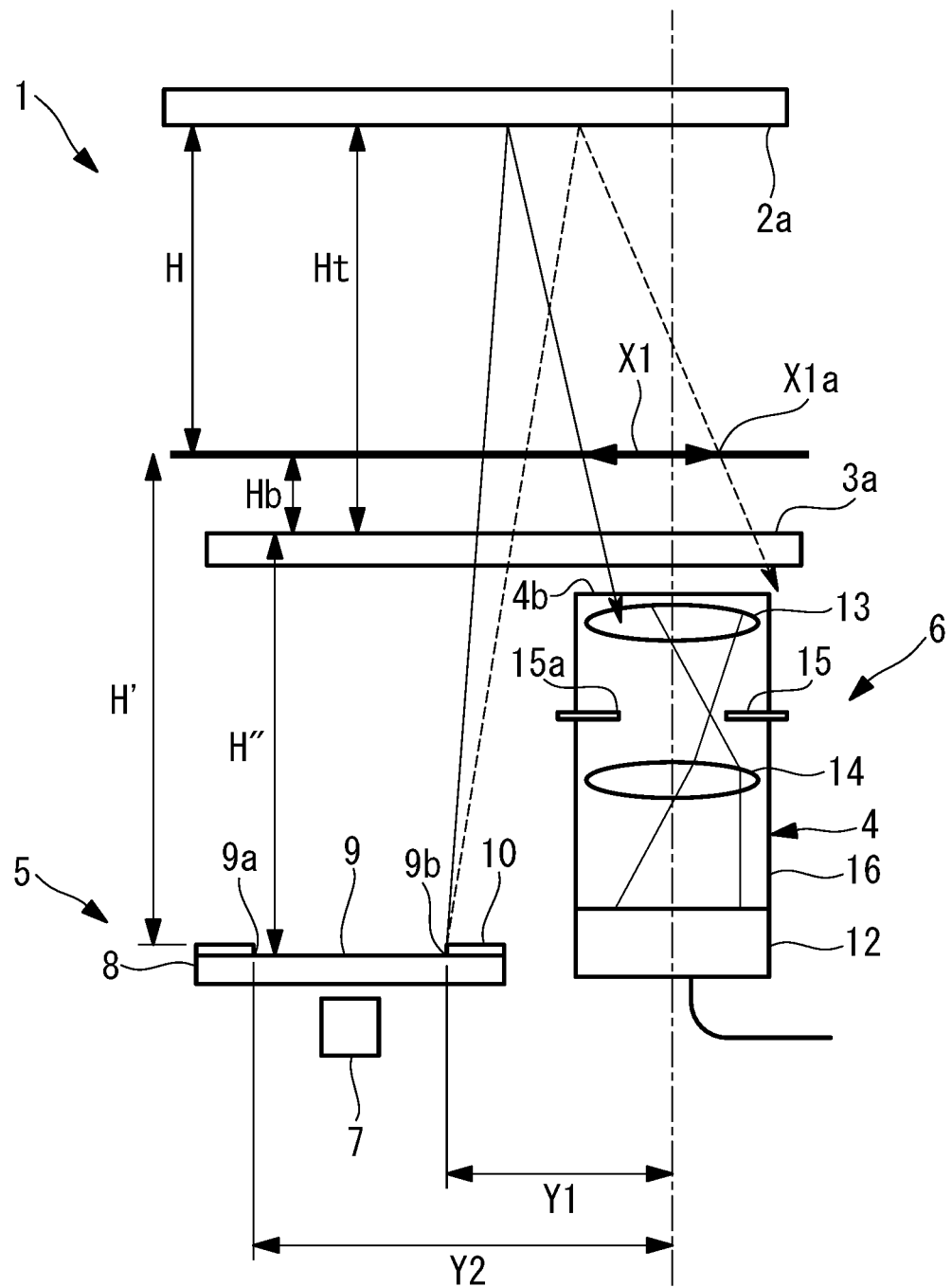
FIG. 9 is a longitudinal cross-sectional view showing, in the diffusion plate in FIG. 1, an example of a trajectory of the light ray of the illumination light emitted from an emission-region end close to the objective optical system.

As shown in FIG. 9, the illumination light emitted from an emission-region end 9b in the diffusion plate 8, which is close to the objective optical system 4, enters the objective optical system 4 at a minimum angle. Also, the condition for achieving oblique illumination in the entire observation field of view is that an image of the illumination light that is emitted from the emission-region end 9b in the diffusion plate 8 and that has passed through the right end X1a of the field of view is formed inside the pupil 15 of the objective optical system 4.

In this case a distance Y1 to the emission-region end 9b in the diffusion plate 8, which is close to the objective optical system 4 with respect to the optical axis of the objective optical system, satisfies conditional expression (7').

$$Y1+(FOVy/2)<NA(2H+H') \quad (7')$$

Figure 10A:
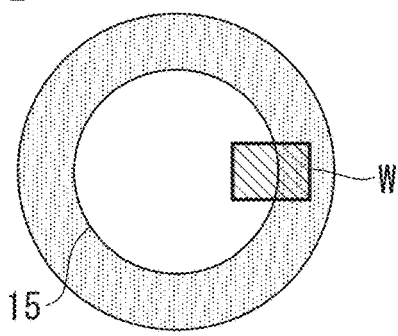
FIG. 10A is a diagram showing an example of the position of luminous flux in the pupil surface for the light that has passed the left end of the field of view.
Figure 10B:
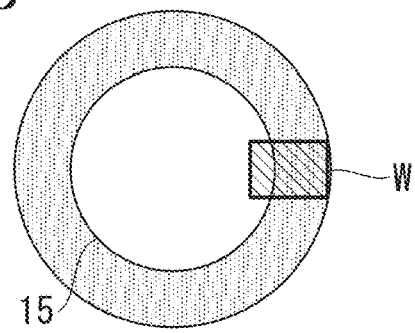
FIG. 10B is a diagram showing an example of the position of luminous flux in the pupil surface for the light that has passed the right end of the field of view.

FIG. 10A shows the position of the luminous flux W at the pupil surface of the objective optical system 4 for the illumination light that has passed through the left end of the field of view, and FIG. 10B shows the position of the luminous flux W at the pupil surface of the objective optical system 4 for the illumination light that has passed through the right end X1a of the field of view.

Figure 11A:
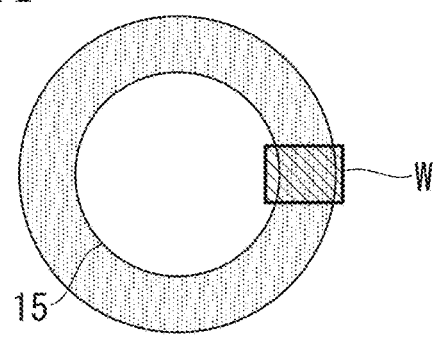
FIG. 11A is a diagram showing an example of the position of luminous flux in the pupil surface for the light that has passed the left end of the field of view.
Figure 11B:
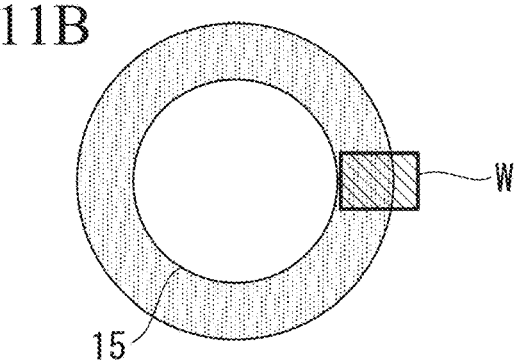
FIG. 11B is a diagram showing an example of the position of luminous flux in the pupil surface for the light that has passed the right end of the field of view.

When Y1 exceeds the value indicated by conditional expression (7'), because the entire luminous flux W of the illumination light falls outside the pupil 15, an image thereof becomes dark, as shown in FIG. 11B.

FIG. 11A shows the position of the luminous flux W at the pupil surface of the objective optical system 4 for the illumination light that has passed through the left end of the field of view, and FIG. 11B shows the position of the luminous flux W at the pupil surface of the objective optical system 4 for the illumination light that has passed through the right end X1a of the field of view. Note that a light ray indicated by the dotted line in FIG. 9 corresponds to an end surface on a side close to the optical axis of the luminous flux W at the pupil surface shown in FIG. 11B.

Figure 12:
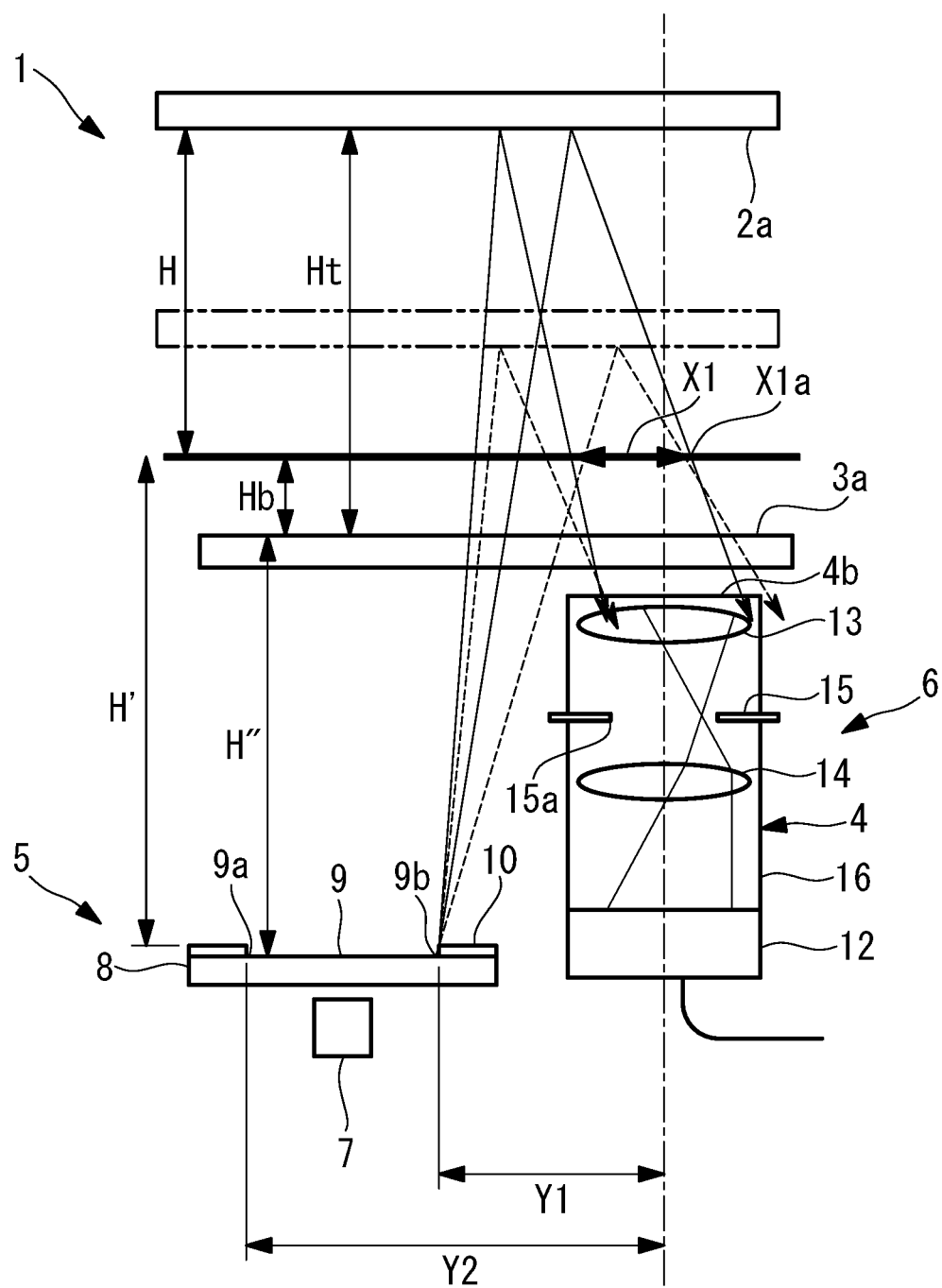
FIG. 12 is a longitudinal cross-sectional view showing, in the diffusion plate in FIG. 1, another example of the trajectory of the light ray of the illumination light emitted from the emission-region end close to the objective optical system.

As shown in FIG. 12, the angle at which the illumination enters the objective optical system 4 increases with a decrease in the height of the top plate 2a of the container 2, which makes it easier for the image of the illumination light at the pupil surface to fall outside the pupil end. Therefore, it is desirable that conditional expression (2') be satisfied with respect to the container 2 in which the height of the top plate 2a is the lowest (height H min).

In this case, the distance Y1 to the emission-region end 9b in the diffusion plate 8, which is close to the objective optical system 4 with respect to the optical axis of the objective optical system 4, needs to satisfy conditional expressions (7) and (8).

$$Y1<NA(2H \min+H'\min)-(FOVy/2) \quad (7)$$

$$Y1<NA(2Ht \min+H''-Hb \min)-(FOVy/2) \quad (8)$$

Here, H' min is the lowest value of the height of the specimen surface X1 with respect to the emission region 9 in the diffusion plate 8.

Figure 13A:
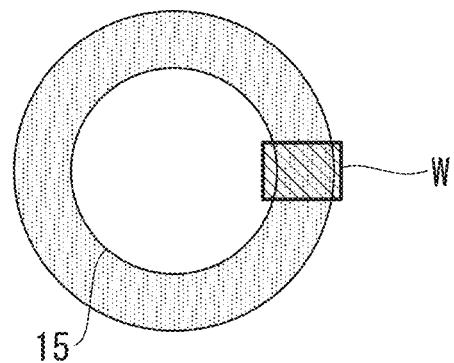
FIG. 13A is a diagram showing an example of the position of luminous flux of the illumination light in the pupil surface in the case in which the top plate of the container is low.
Figure 13B:
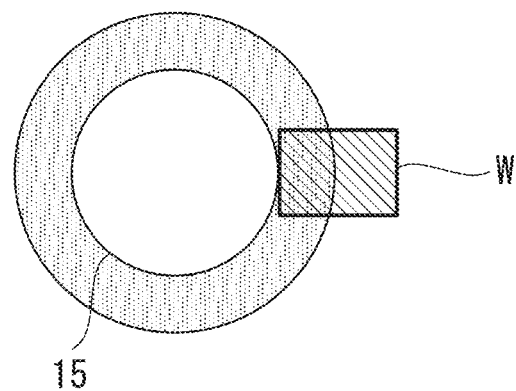
FIG. 13B is a diagram showing an example of the position of luminous flux of the illumination light in the pupil surface in the case in which the top plate of the container is high.

FIG. 13A shows the position of the luminous flux W of the illumination light at the pupil surface in the case in which the height of the top plate 2a of the container 2 is high, and FIG. 13B shows the position of the luminous flux W of the illumination light at the pupil surface in the case in which the height of the top plate 2a of the container 2 is low.

When Y1 exceeds the values indicated by the conditional expressions (7) and (8), because the entire luminous flux W of the illumination light falls outside the pupil 15, as shown in FIG. 13B, the image thereof becomes dark.

With the observation apparatus 1 according to this embodiment, in the case in which the emission region 9 in the illumination optical system 5 is projected to the pupil 15 of the objective optical system 4, the above-described conditional expressions (2), (4), (6), and (8) are satisfied so that the illumination light is partially blocked at an edge portion 15a of the pupil 15 of the objective optical system 4.

The operation of the thus-configured observation apparatus 1 will be described.

In the case in which a transparent specimen X, such as cells, accommodated in the container 2 is observed by using the observation apparatus 1 according to this embodiment, the container 2 is placed on the glass plate 3a of the stage 3 so that the bottom surface 2b faces down in the state in which the specimen X is accommodated in the container 2 and is adhered to the bottom surface 2b, as shown in FIG. 1.

In this state, the LED light source 7 is activated to generate illumination light. The illumination light emitted from the LED light source 7 passes through the glass plate 3a and the bottom surface 2b of the container 2 from below in a state in which the illumination light is spread out by the diffusion plate 8, and is reflected at an inner surface of the top plate 2a of the container 2, thus being radiated onto the specimen X from diagonally above.

Of the illumination light radiated onto the specimen X, the transmitted light that has passed through the specimen X passes through the bottom surface 2b of the container 2 and the glass plate 3a downward from above, and enters the objective optical system 4 diagonally with respect to the optical axis. At this time, the illumination light is converted to the transmitted light carrying information about the specimen X by being refracted or scattered due to the shape or the refractive index of the specimen X, or by being dimmed due to the transmittance of the specimen X, and this light is collected by the objective optical system 4 and captured by the image-acquisition device 12.

Figure 14:
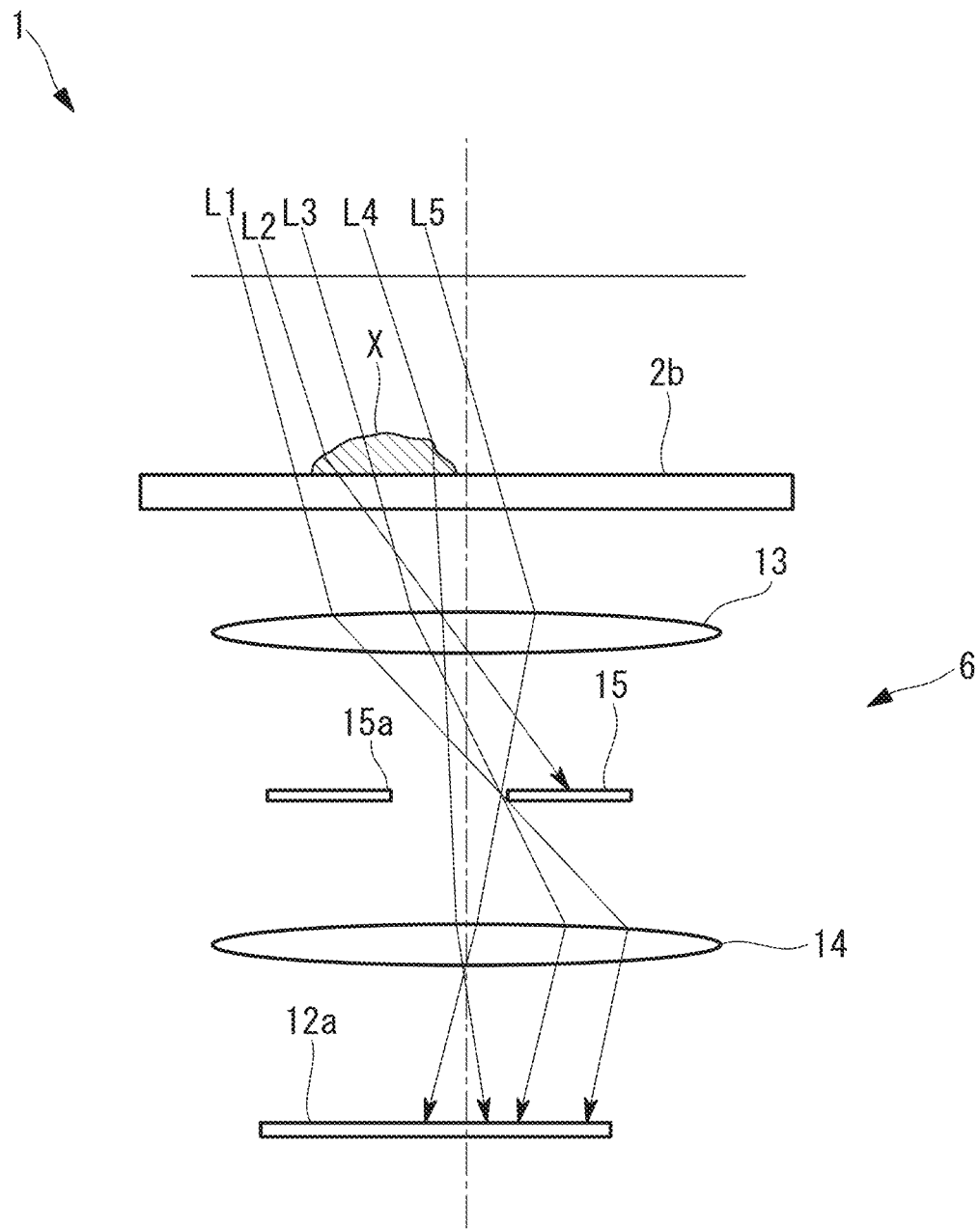
FIG. 14 is a diagram showing examples of trajectories of the illumination light for separate positions through which the light passes in the objective optical system in FIG. 1.
Figure 15:
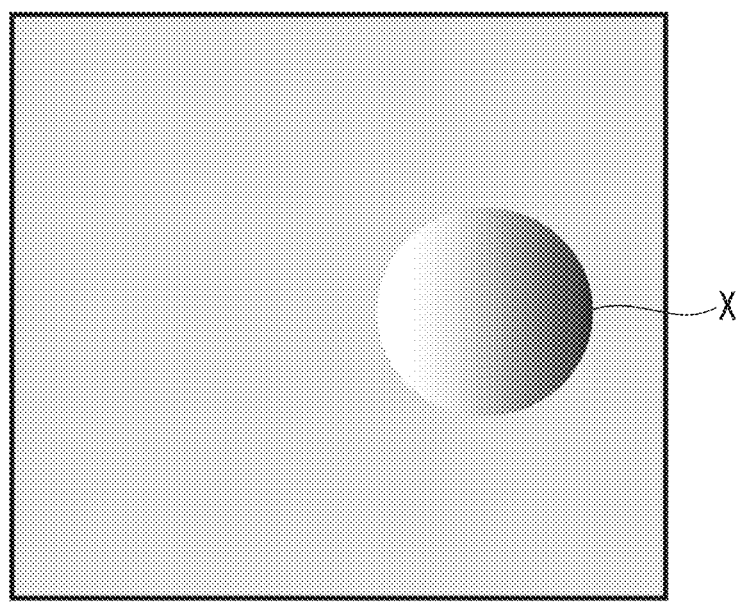
FIG. 15 is a diagram showing an example of a specimen that is three-dimensionally viewed by using oblique illumination.

Here, in the objective optical system 4, the transmitted light passing outside the pupil 15 is blocked. As shown in FIG. 14, in the case in which the angle at which the illumination light enters the objective optical system 4 is equivalent to the acceptance angle of the objective optical system 4, illumination light beams L1 and L5, which do not pass through the specimen X, pass through the vicinity of the edge portion 15a of the pupil 15, and reach the image surface 12a. In addition, an illumination light L2 that has passed through a left end of the specimen X is refracted at the specimen X and reaches outside the pupil 15, which causes vignetting thereof, and thus, this light does not reach the image surface 12a. In addition, an illumination light L3, which has passed through near the center of the specimen X, and an illumination light L4, which has passed through a right side of the specimen X, are refracted at the specimen X, pass through the inside of the edge portion 15a of the pupil 15, and reach the image surface 12a. As a result, a shadow is formed in the specimen X creating a three-dimensional appearance, as shown in FIG. 15.

As has been described above, with the observation apparatus 1 according to this embodiment, as a result of disposing both of the illumination optical system 5 and the image-capture optical system 6 below the specimen X, there is an advantage in that, as compared with a transmitted-light observation apparatus in the related art in which the illumination optical system and the image-capture optical system are disposed on either side of the specimen, it is possible to make the apparatus thinner by an amount achieved by aggregating the illumination optical system 5 and the image-capture optical system 6 only on one side of the specimen X. In addition, there is an advantage in that, in such a thinner observation apparatus 1 also, it is possible to observe an imaging subject, such as cells by capturing the transmitted light without labeling the imaging subject.

In this case, by satisfying the above-described conditional expressions (2), (4), (6), and (8), the illumination light is partially blocked at the edge portion 15a of the pupil 15 of the objective optical system 4 in the case in which the emission region 9 in the illumination optical system 5 is projected to the pupil 15 of the objective optical system 4, which makes it possible to form contrast in an image of the specimen X, and thus, a three-dimensional appearance of the specimen X is created. Therefore, it is possible to three-dimensionally observe the specimen X in the container 2 with a good contrast by using oblique illumination.

In addition, in this embodiment, the illumination light emitted from the LED light source 7 is uniformly spread out by the diffusion plate 8, and thus, it is possible to irradiate the specimen X with the illumination light having uniform intensity and low illumination unevenness.

This embodiment may additionally be provided with a height-correcting tool for increasing the lowest value Ht min of the height of the reflection surface.

The height-correcting tool has a reflection surface that reflects the illumination light and can be disposed above the container 2. For example, an empty container having a top plate or an empty container with a lid is employed as such a height-correcting tool. The empty container may be the same type as the container 2 that accommodates the specimen X or a different type therefrom. With a container with a lid, such as a petri dish or a well plate, only the lid may be employed as the height-correcting tool.

The position of the reflection surface becomes higher as a result of placing the height-correcting tool on top of the container 2 accommodating the specimen X. By doing so, the conditions related to NA min defined by conditional expressions (3) and (4) are relaxed, and it becomes possible to use an objective optical system 4 having a lower NA and a larger field of view.

FIRST EXAMPLE

Next, a first example of an observation apparatus 21 according to the embodiment of the present invention will be described below.

Figure 16:
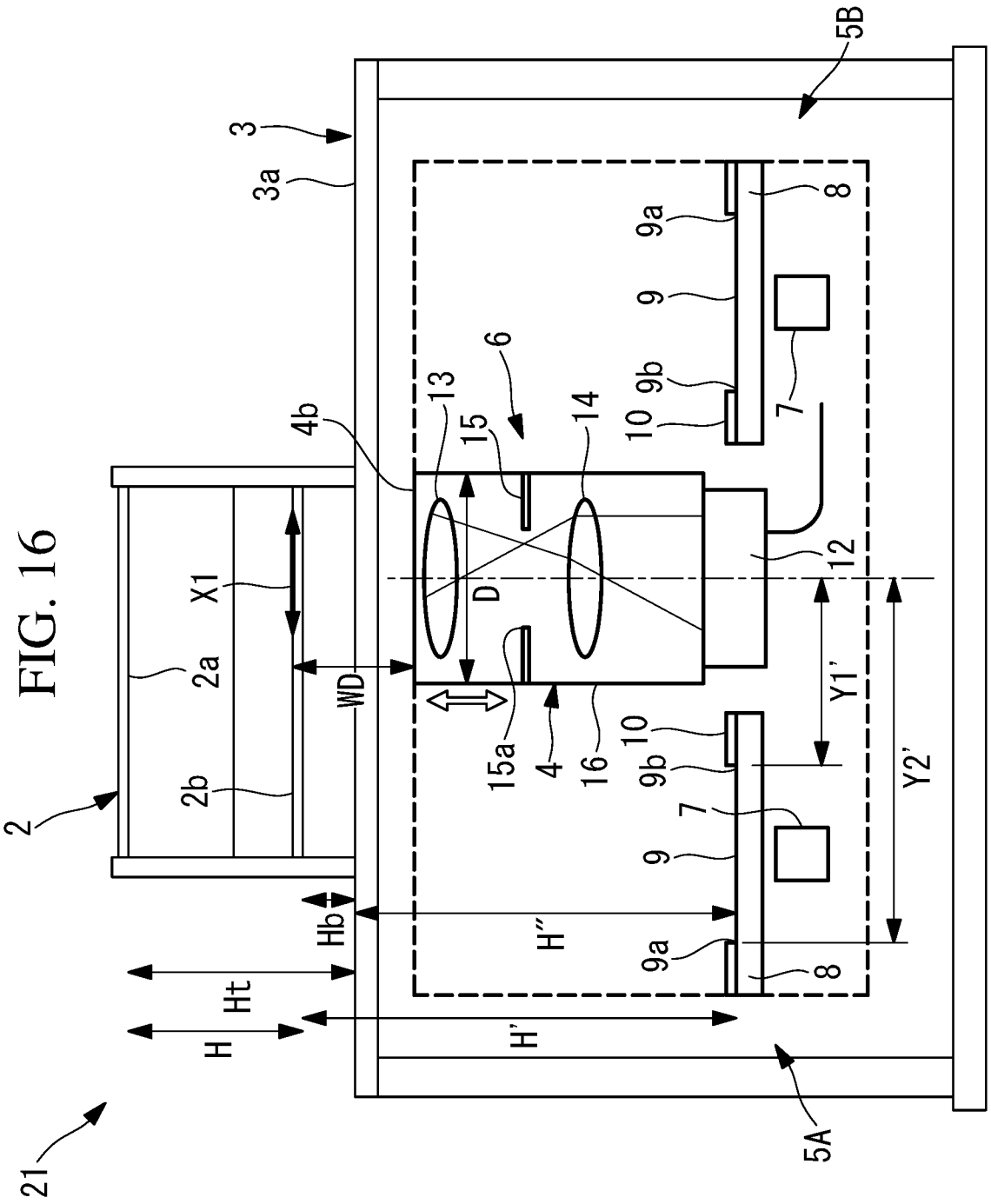
FIG. 16 is a longitudinal cross-sectional view showing, in outline, the configuration of an observation apparatus according to a first example of the embodiment of the present invention.
Figure 17:
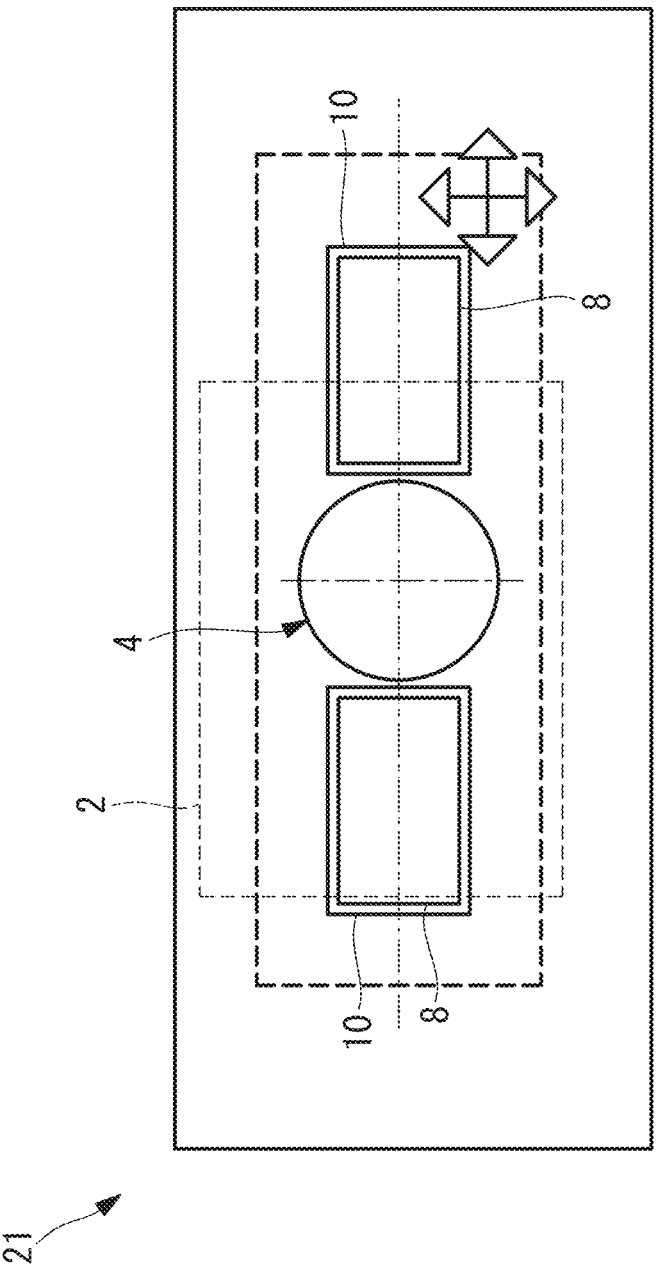
FIG. 17 is a lateral cross-sectional view of the observation apparatus in FIG. 16 viewed from above along the optical axis of an objective optical system thereof.

As shown in FIGS. 16 and 17, the observation apparatus 21 according to this Example is provided with two illumination optical systems 5A and 5B that are disposed on either side of the objective optical system 4 of the image-capture optical system 6 with a spacing therebetween in a direction orthogonal to the optical axis of the objective optical system 4.

In addition, the illumination optical systems 5A and 5B and the objective optical system 4 are installed in an XY-stage (driving portion, which is not shown), and are configured so that it is possible to move the observation position in XY-directions by means of the XY-stage. The image-capture optical system 6 is installed in a Z-stage (not shown), and is configured so as to allow focusing. Note that an appropriate one of the illumination optical systems 5A and 5B may be used in accordance with the observation position.

The container 2 is assumed to be a cell-culturing flask or a well plate, and the air-equivalent length of a height Ht of the top plate 2a is approximately 15 to 40 mm. The air-equivalent length of the height Hb of the specimen surface X1 (cell-adhering surface) with respect to the top surface (container mounting surface) of the glass plate 3a of the stage 3 is approximately 2 mm.

For an objective optical system 4 with which it is possible to distinguish the shape of the specimen X such as cells, and that is suitable for analyzing the number or density of the cells accommodated in the container 2, the actual field of view FOVy is approximately 3 mm.

In addition, due to structural requirements, the working distance WD of the objective optical system 4 is approximately 5 mm, and the allowance T of the frame 16 of the objective optical system 4 with respect to a luminous flux is approximately 3 mm.

According to the above-described conditional expressions (3) and (4), the minimum value Dmim of the diameter of the portion of the frame 16 of the objective optical system 4 close to the specimen X, required on the basis of the oblique-illumination condition, is 7.33 mm, and the lowest value NA min of the numerical aperture (NA) on the specimen-X side of the objective optical system 4, required on the basis of the oblique-illumination condition, is 0.17.

In consideration of the variability in the inclination of the top plate 2a of the container 2 and manufacturing errors thereof, NA is assumed to be slightly greater than the value indicated by conditional expression (3), namely, NA=0.25, and the diameter D of the portion of the frame 16 of the objective optical system 4 close to the specimen X is assumed to be 8.5 mm.

FIG. 18 shows conditions for satisfying conditional expressions (5), (6), (7), and (8) by changing a height H" of the top surface (container mounting surface) of the glass plate 3a of the stage 3 with respect to the emission region 9 in the diffusion plate 8 of the illumination optical system 5 when using these values of NA and D.

With the observation apparatus 21 according to this Example, the specification of the objective optical system 4 and the layout of the illumination optical system 5 satisfy all conditions, and thus, it is possible to three-dimensionally observe various cells in the container 2 with a good contrast by using oblique illumination.

SECOND EXAMPLE

Next, a second example of the observation apparatus 21 according to the embodiment of the present invention will be described below.

Figure 19:
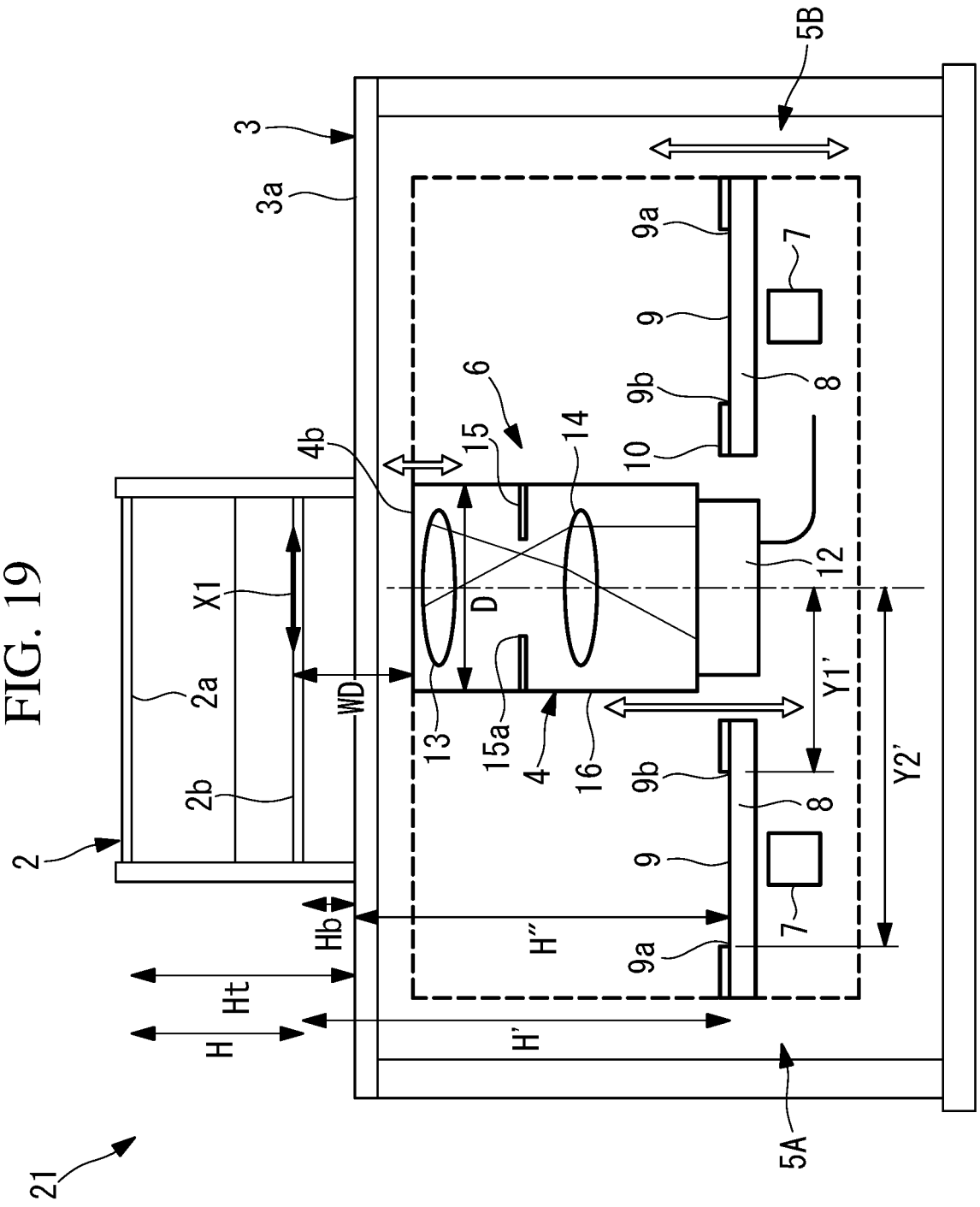
FIG. 19 is a longitudinal cross-sectional view showing, in outline, the configuration of an observation apparatus according to a second example of the embodiment of the present invention.

As shown in FIG. 19, in this Example, the diffusion plate 8 and the LED light source 7 are installed in the Z-stage (driving portion, which is not shown), the diffusion plate 8 and the LED light source 7 are moved by means of the Z-stage in a direction along the optical axis of the objective optical system 4, and the positions of the diffusion plate 8 and the LED light source 7 are changed in accordance with the height of the top plate 2a of the container 2 to be employed.

The height H" of the bottom surface 2b of the container 2 with respect to the emission region 9 in the diffusion plate 8 is assumed to be variable in a range of 3 to 8 mm, the distance Y1 to the emission-region end 9b in the diffusion plate 8, which is close to the objective optical system 4 with respect to the optical axis of the objective optical system 4, is assumed to be 9.3 mm, and the distance Y2 to the emission-region end 9a in the diffusion member 8, which is far from the objective optical system 4 with respect to the optical axis of the objective optical system 4, is assumed to be 26 mm.

As the container 2, a container in which the height of the top plate 2a is low, such as a dish, for example, a container in which the height Ht of the top plate 2a with respect to the bottom surface 2b of the container 2 is 10 mm and the height Hb of the specimen surface X1 with respect to the bottom surface 2b of the container 2 is 1 mm may be employed.

According to conditional expressions (3) and (4), the minimum value D min of the diameter of the portion of the frame 16 of the objective optical system 4 close to the specimen X, required on the basis of the oblique-illumination condition, is 8.5 mm, and the lowest value NA min of the numerical aperture (NA) on the specimen-X side of the objective optical system 4, required on the oblique-illumination condition, is greater than 0.25.

In consideration of the variability in the inclination of the top plate 2a of the container 2 and manufacturing errors thereof, NA is assumed to be slightly greater than the value indicated by conditional expression (3), namely, NA=0.3, and the diameter D of the portion of the frame 16 of the objective optical system 4 close to the specimen X is assumed to be 9.0 mm.

FIG. 20 shows conditions for satisfying conditional expressions (5), (6), (7), and (8) by changing the height H" of the top surface (container mounting surface) of the glass plate 3a of the stage 3 with respect to the emission region 9 in the diffusion plate 8 of the illumination optical system 5 when using these values of NA and D.

With the observation apparatus 21 according to this Example, conditional expressions (5), (6), (7), and (8) are satisfied by moving, by means of the Z-stage, the diffusion plate 8 and the LED light source 7 along the optical axis of the objective optical system 4 in a direction away from the container 2 (by increasing H") in the case in which the height of the top plate 2a of the container 2 is low (in the case in which Ht is low). In addition, conditional expressions (5), (6), (7), and (8) are satisfied by bringing, by means of the Z-stage, the diffusion plate 8 and the LED light source 7 close to the container 2 along the optical axis of the objective optical system 4 (by decreasing H") in the case in which the height of the top plate 2a of the container 2 is high.

By doing so, it is possible to satisfy the conditions for observing the specimen X in the container 2 with a good contrast by using oblique illumination without having to increase Y2 (the distance to the emission-region end 9a of the emission region 9 in the diffusion member 8, which is far from the objective optical system 4 with respect to the optical axis of the objective optical system 4), and thus, it is possible decrease the installation area for the entire apparatus.

THIRD EXAMPLE

Next, a third example of the observation apparatus 21 according to the embodiment of the present invention will be described below.

Figure 21:
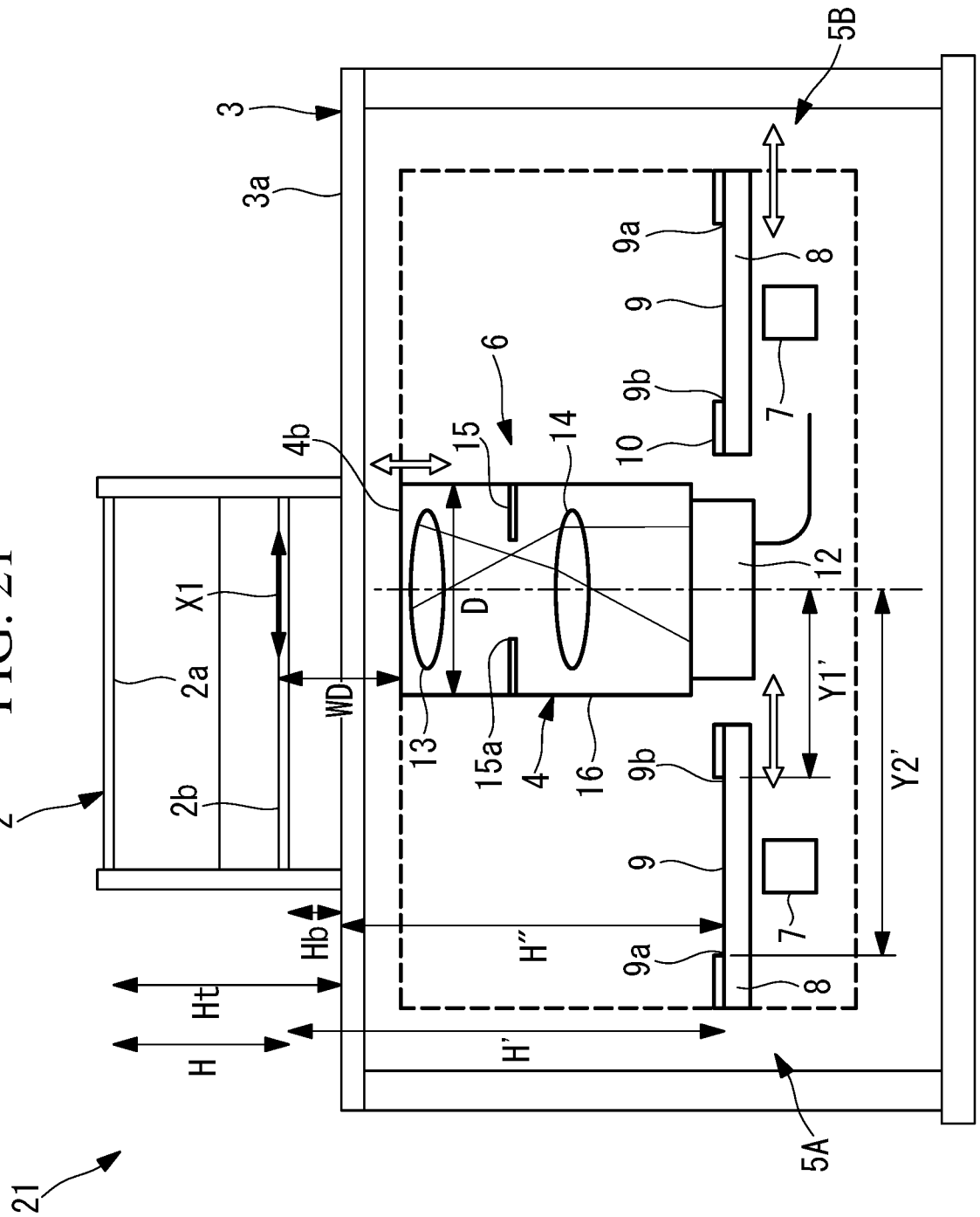
FIG. 21 is a longitudinal cross-sectional view showing, in outline, the configuration of an observation apparatus according to a third example of the embodiment of the present invention.

As shown in FIG. 21, in this Example, the diffusion plate 8 and the LED light source 7 are moved in a direction orthogonal to the optical axis of the objective optical system 4 by means of the XY-stage, and the positions of the diffusion plate 8 and the LED light source 7 are changed in accordance with the height of the top plate 2a of the container 2 to be employed.

The height H" of the top surface (container mounting surface) of the glass plate 3a of the stage 3 with respect to the emission region 9 in the diffusion plate 8 is assumed to be 18 mm. In addition, the distance Y1 from the emission-region end 9b in the diffusion plate 8, which is close to the objective optical system 4 with respect to the optical axis of the objective optical system 4, is assumed to be variable within a range of 9.3 to 19 mm, the distance Y2 from the emission-region end 9a in the emission region 9 of the diffusion member 8, which is far from the objective optical system 4 with respect to the optical axis of the objective optical system 4, is assumed to be variable in a range of 21.3 to 31 mm, and Y2-Y1 is assumed to be 12 mm.

Differences from the second Example will be described below.

FIG. 22 shows the conditions for satisfying conditional expressions (5), (6), (7), and (8) by changing the height H" of the bottom surface 2b of the container 2 with respect to the emission region 9 in the diffusion plate 8 of the illumination optical system 5 when using the values of NA=0.3 and D=9.0 mm.

With the observation apparatus 21 according to this Example, conditional expressions (5), (6), (7), and (8) are satisfied by bringing, by means of the XY-stage, the diffusion plate 8 and the LED light source 7 close to the objective optical system 4 in the case in which the height of the top plate 2a of the container 2 is low (in the case in which Ht is low). In addition, conditional expressions (5), (6), (7), and (8) are satisfied by moving, by means of the XY-stage, the diffusion plate 8 and the LED light source 7 away from the objective optical system 4 in the case in which the height of the top plate 2a of the container 2 is high. By doing so, the area of the diffusion plate 8 is decreased, which makes it possible to decrease the distance between the diffusion plate 8 and the LED light source 7, and thus, it is possible to realize bright illumination by increasing the light density at the diffusion plate 8.

FOURTH EXAMPLE

Next, a fourth example of the observation apparatus 21 according to the embodiment of the present invention will be described below.

Figure 23:
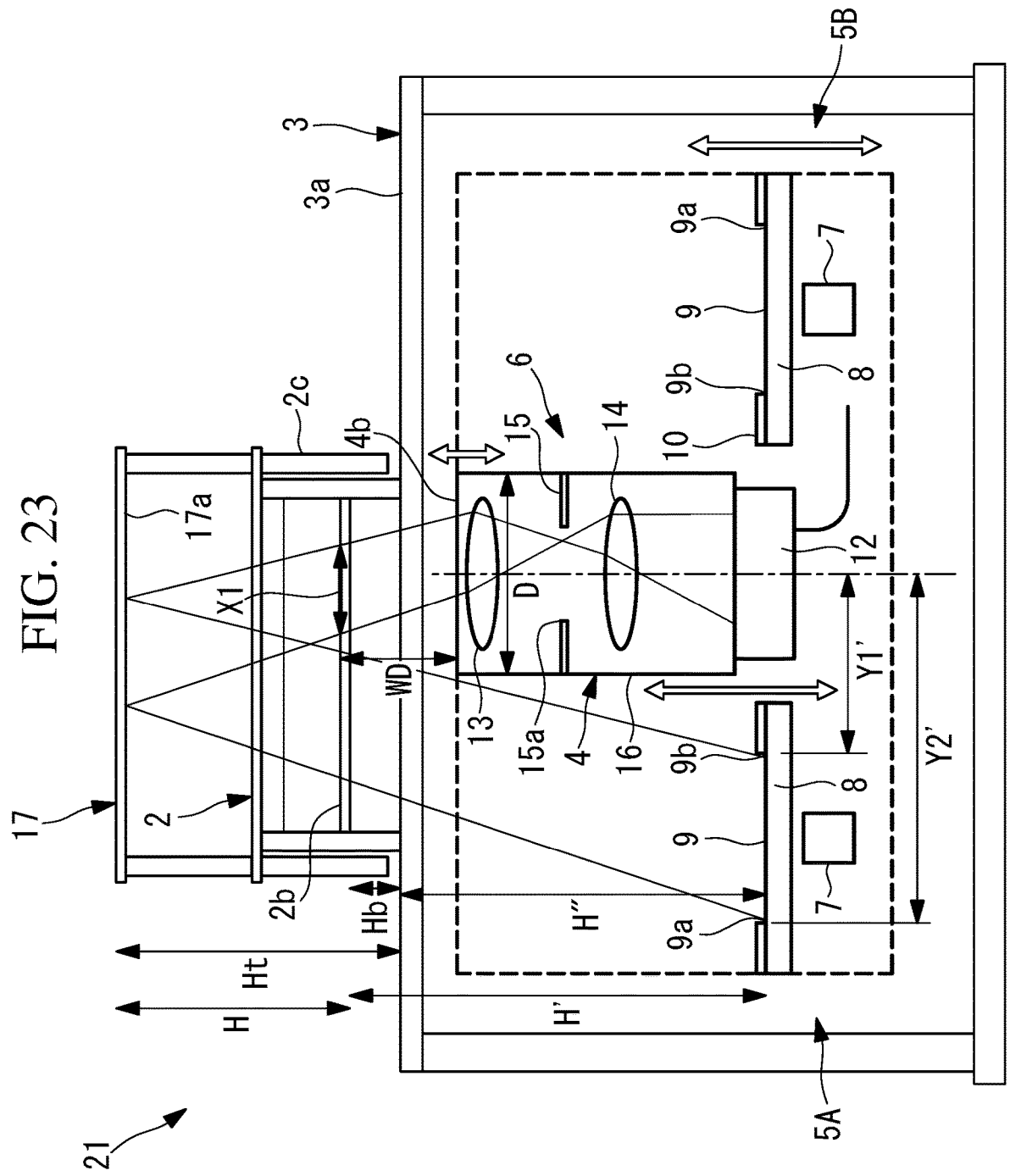
FIG. 23 is a longitudinal cross-sectional view showing, in outline, the configuration of an observation apparatus according to a fourth example of the embodiment of the present invention.

As shown in FIG. 23, this Example is provided with a height-correcting tool 17 for increasing the minimum value Ht min of the height of the reflection surface.

The container 2 is assumed to be a petri dish with a lid 2c, and an inner surface of the lid 2c serves as a reflection surface. The height-correcting tool 17 is an empty container 2 that is different from the container 2 that accommodates the specimen X, and the inner surface of the lid 2c serves as a reflection surface 17a. The height-correcting tool 17 is placed on the lid 2c of the container 2 that accommodates the specimen X. In the example in FIG. 23, only the lid 2c is used as the height-correcting tool 17.

With the observation apparatus 21 according to this Example, as a result of employing the height-correcting tool 17, the minimum value Ht min of the height of the reflection surface is increased as compared with the case in which only the container 2 that accommodates the specimen X is employed, and, by doing so, the values of the lowest value NA min of the numerical aperture defined by conditional expressions (3) and (4) are decreased. In other words, it is possible to use an objective optical system 4 having a low NA and a large actual field of view FOVy as compared with the case in which only the container 2 that accommodates the specimen X is employed.

FIG. 24 shows the conditions for satisfying conditional expressions (5), (6), (7), and (8) by changing the height H" of the top surface (container mounting surface) of the glass plate 3a of the stage 3 with respect to the emission region 9 in the diffusion plate 8 of the illumination optical system 5 when using values of NA=0.16 and D=8.6 mm.

Figure 25:
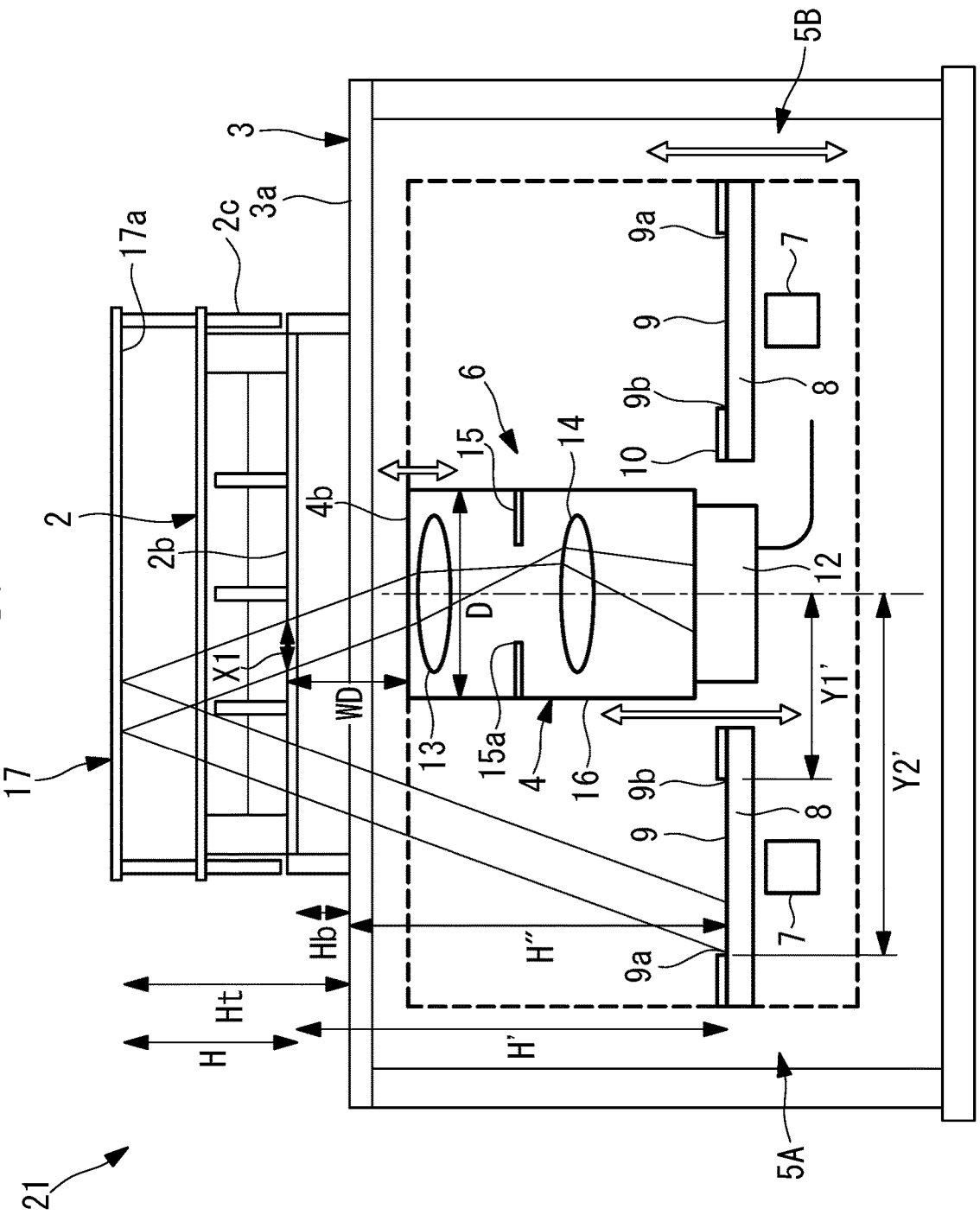
FIG. 25 is a longitudinal cross-sectional view showing, in outline, the configuration of a modification of the observation apparatus in FIG. 23.

FIG. 25 shows an example in which the well plate with the lid 2c is used as the container 2 that accommodates the specimen X. As the height-correcting tool 17, the lid 2c of the well plate is suitably employed. An empty well plate with the lid 2c that is the same type as the container 2 may be employed as the height-correcting tool 17.

In the example in FIG. 25, the specimen surfaces X1 in the individual wells are illuminated by the illumination light that has been reflected by the reflection surface 17a of the height-correcting tool 17 after entering adjacent wells. Therefore, it is possible to use a well plate having a small well diameter to observe the specimens X.

As above, although an embodiment of the present invention has been described in detail with respect to the drawings, specific configurations are not limited to those of this embodiment, and design alterations or the like within a range that does not depart from the scope of the present invention are also encompassed. For example, although this embodiment assumes that the specimen X is accommodated in the container 2 having the top plate 2a, such as a cell-culturing flask, and that Fresnel reflection of the illumination light occurs at the inner surface of the top plate 2a of the container 2, there is no limitation thereto.

For example, in the case in which the specimen X is accommodated in a container that does not have the top plate 2a, such as a petri dish (no lid), a reflective member, such as a mirror, may be disposed at a position that blocks the top opening of the petri dish, and the illumination light that has passed through a bottom surface of the petri dish upward from below may be reflected at one surface (reflection surface) of this reflective member. The reflective member may be provided so as to allow insertion into and retraction from a position above the specimen X by means of a linear motion or a swinging motion.

In addition, in the case in which the specimen X is accommodated in a container that does not have the top plate 2a, such as a petri dish (no lid), the petri dish may be filled with a solution (for example, a culturing medium, a phosphate buffer, or the like), the specimen X may be immersed in the solution, and the illumination light that has passed through a bottom surface of the petri dish upward from below may be reflected at a liquid surface (reflection surface) at the top of the solution. In the case in which the specimen X is accommodated in the container 2 having the top plate 2a also, the container 2 may be filled with a solution (for example, a culturing medium, a phosphate buffer, or the like) and the specimen X may be immersed in the solution. In these modifications, instead of the height of the top plate 2a of the container 2, the height of the one surface of the reflective member or the liquid surface at the top of the solution may be applied to the individual conditional expressions described above.

As a result, the above-described embodiment leads to the following aspect.

An aspect of the present invention is an observation apparatus including an illumination optical system that emits illumination light upward from below a specimen; and an image-capture optical system that captures, below the specimen, transmitted light which is the illumination light emitted from the illumination optical system that has been reflected above the specimen and passed through the specimen, wherein the illumination optical system is provided with a diffusion member that spreads out the illumination light from an emission region having a specific area, the image-capture optical system is provided with an objective optical system that collects the transmitted light, and, in the case in which the emission region in the illumination optical system is projected to a pupil of the objective optical system, the following conditions are satisfied so as to partially block the illumination light at an edge portion of the pupil of the objective optical system.

$$NA\ min > (D+FOVy)/(4Ht\ min - 4Hb\ min + 2WD)$$

$$NA\ min > (FOVy + T/2)/(2Ht\ min - 2Hb\ min)$$

$$Y2 > NA(2Ht\ max + H'' - Hb\ max) + (FOVy/2)$$

$$Y1 > NA(2Ht\ min + H'' - Hb\ min) + (FOVy/2)$$

where NA min is a lowest value of a numerical aperture on a specimen side of the objective optical system required on the basis of an oblique-illumination condition; D is a diameter of a portion of a frame of the objective optical system close to the specimen; FOVy is an actual field of view of the objective optical system; Ht min is a lowest value of a height of a reflection surface for the illumination light above the specimen with respect to a surface on which the specimen is placed; Hb min is a lowest value of a height of a surface at which the illumination light is incident on the specimen with respect to the surface on which the specimen is placed; WD is a working distance of the objective optical system; T is a difference between the diameter of the portion of the frame of the objective optical system close to the specimen and a diameter of an effective luminous-flux of the objective optical system at that portion; Y2 is a distance to an end in the emission region of the diffusion member, which is far from the objective optical system with respect to an optical axis of the objective optical system; Ht max is a highest value of the height of the reflection surface for the illumination light above the specimen with respect to the surface on which the specimen is placed; H" is a height of the surface on which the specimen is placed with respect to the emission region of the diffusion member; Hb max is a highest value of the height of the surface at which the illumination light is incident on the specimen with respect to the surface on which the specimen is placed; and Y1 is the distance to an end in the emission region of the diffusion member close to the objective optical system with respect to the optical axis of the objective optical system.

With this aspect, the illumination light that is emitted from the illumination optical system below the specimen is reflected above the specimen and passes through the specimen downward from above. The transmitted light that has passed through the specimen is captured by the image-capture optical system disposed below the specimen. Because both of the illumination optical system and the image-capture optical system are disposed below the specimen, it is possible to observe the specimen without labeling the specimen by capturing the transmitted light without causing the size of the apparatus to increase. In this case, by satisfying the above-described conditions, it is possible to three-dimensionally observe the specimen in the container with a good contrast by using oblique illumination.

The above-described aspect may be provided with a driving portion that moves the diffusion member in at least one of a direction along an optical axis of the objective optical system and a direction that intersects the optical axis.

By employing such a configuration, it is possible to satisfy the conditions for observing the specimen in the container with a good contrast by using oblique illumination, by moving, by means of the driving portion, the diffusion member in the direction in which the diffusion member is moved away from the container along the optical axis of the objective optical system in the case in which the height of the reflection surface for the illumination light above the specimen with respect to the surface on which the specimen is placed is low, and by moving, by means of the driving portion, the diffusion member in the direction in which the diffusion member is brought close to the container along the optical axis of the objective optical system in the case in which the height of the reflection surface for the illumination light above the specimen with respect to the surface on which the specimen is placed is high. By doing so, it is not necessary to increase Y2 (the distance to the end of the emission region in the diffusion member, which is far from the objective optical system with respect to the optical axis of the objective optical system), and thus, it is possible to decrease the installation area for the entire apparatus.

In addition, it is possible to satisfy the conditions for observing the specimen in the container with a good contrast by using oblique illumination, by bringing, by means of the driving portion, the diffusion member close to the objective optical system in the case in which the height of the reflection surface for the illumination light above the specimen with respect to the surface on which the specimen is placed is low, and by moving, by means of the driving portion, the diffusion member away from the objective optical system in the case in which the height of the reflection surface for the illumination light above the specimen with respect to the surface on which the specimen is placed is high. By doing so, the area of the diffusion member is decreased, which makes it possible to decrease the distance between the diffusion member and a light source that generates the illumination light, and thus, it is possible to realize bright illumination by increasing the light density at the diffusion member.

The above-described aspect may be provided with a height-correcting tool that has the reflection surface and that can be disposed above the specimen.

By disposing the height-correcting tool above the specimen, for example, above the container that accommodates the specimen, it is possible to increase the lowest value Ht min of the height of the reflection surface.

The present invention affords an advantage in that it is possible to three-dimensionally observe, with a good contrast, a specimen such as cells or the like by using oblique illumination without causing the size of the apparatus to increase.

REFERENCE SIGNS LIST 1, 21 observation apparatus
2 container
2a top plate (reflection surface)
2b bottom surface (mounting surface)
4 objective optical system (objective lens)
5 illumination optical system
6 image-capture optical system
7 LED light source
8 diffusion plate (diffusion member)
9 emission region
15 pupil (aperture)
16 frame
17 height-correcting tool
17a reflection surface
X specimen

The invention claimed is:
1. An observation apparatus comprising:
an illumination optical system that emits illumination light upward from below a specimen accommodated in a container; and
an image-capture optical system that captures, below the specimen, transmitted light which is the illumination light emitted from the illumination optical system that has been reflected above the specimen and passed through the specimen,
wherein the illumination optical system is provided with a diffusion member that spreads out the illumination light from an emission region having a specific area,
the image-capture optical system is provided with an objective optical system that collects the transmitted light, and
in the case in which the emission region in the illumination optical system is projected to a pupil of the objective optical system, the following conditions are satisfied so as to partially block the illumination light at an edge portion of the pupil of the objective optical system;

$NA\ min > (D+FOVy)/(4Ht\ min - 4Hb\ min + 2WD)$ $NA\ min > (FOVy + T/2)/(2Ht\ min - 2Hb\ min)$ $Y2 > NA(2Ht\ max + H'' - Hb\ max) + (FOVy/2)$ $Y1 > NA(2Ht\ min + H'' - Hb\ min) + (FOVy/2)$ where NA min is a lowest value of a numerical aperture on a specimen side of the objective optical system required on the basis of an oblique-illumination condition; D is a diameter of a portion of a frame of the objective optical system close to the specimen; FOVy is an actual field of view of the objective optical system; Ht min is a lowest value of a height of a reflection surface for the illumination light above the specimen with respect to a container mounting surface; Hb min is a lowest value of a height of a surface at which the illumination light is incident on the specimen with respect to the container mounting surface; WD is a working distance of the objective optical system; T is a difference between the diameter of the portion of the frame of the objective optical system close to the specimen and a diameter of an effective luminous-flux of the objective optical system at that portion; Y2 is a distance to an end in the emission region of the diffusion member, which is far from the objective optical system with respect to an optical axis of the objective optical system; Ht max is a highest value of the height of the reflection surface for the illumination light above the specimen with respect to the container mounting surface; H" is a height of the container mounting surface with respect to the emission region of the diffusion member; Hb max is a highest value of the height of the surface at which the illumination light is incident on the specimen with respect to the container mounting surface; and Y1 is the distance to an end in the emission region of the diffusion member close to the objective optical system with respect to the optical axis of the objective optical system.

2. An observation apparatus according to claim 1, further comprising a stage configured to move the diffusion member in at least one of a direction along the optical axis of the objective optical system and a direction that intersects the optical axis.

3. An observation apparatus according to claim 1, further comprising a height-correcting tool having the reflection surface and disposed above the specimen.

* * * * *